(12) United States Patent
Yamada et al.

(10) Patent No.: US 6,301,204 B1
(45) Date of Patent: Oct. 9, 2001

(54) JUKEBOX WITH CONTROL SYSTEM TO RETRY TRANSFER IF MISALIGNMENT

(75) Inventors: Kazuhiro Yamada; Hiroshi Yamagishi; Kazunori Matsuda; Kouichi Minami; Isao Nagata; Yoshiyasu Tagawa; Kazuaki Umi; Hitoshi Terashima, all of Ishikawa (JP)

(73) Assignee: PFU Limited, Ishikawa (JP)

( * ) Notice: Subject to any disclaimer, the term of this patent is extended or adjusted under 35 U.S.C. 154(b) by 781 days.

(21) Appl. No.: 08/525,007

(22) Filed: Sep. 8, 1995

(30) Foreign Application Priority Data

Dec. 27, 1994 (JP) .................................................. 6-324468
Dec. 27, 1994 (JP) .................................................. 6-324469
Feb. 23, 1995 (JP) .................................................. 7-035691

(51) Int. Cl.$^7$ ................................................ G11B 17/22
(52) U.S. Cl. ............................................................ 369/34
(58) Field of Search ............................ 369/34; 360/98.06

(56) References Cited

U.S. PATENT DOCUMENTS 5,001,582 * 3/1991 Numasaki ................................ 369/34
5,040,159 * 8/1991 Oliver et al. .............................. 369/34
5,303,214 * 4/1994 Kulakowski et al. .................. 369/34

* cited by examiner

*Primary Examiner*—David Davis
(74) *Attorney, Agent, or Firm*—Arent Fox Kintner Plotkin & Kahn, PLLC

(57) ABSTRACT

A jukebox apparatus including a magazine, a drive unit, a carriage for conveying a disk between the magazine and the drive unit, and a temporary storage unit movable between a transfer position in front of the drive unit and an escape position. The carriage has gripping arms, pinch rollers, and a pushing arm for transferring the disk. A control unit is provided to carry out a retry of transferring the disk by displacing the carriage when the disk is not transferred. The pushing time of the pushing arm can be changed by a retry of pushing the disk by the pushing arm. The temporary storage unit is normally monitored.

29 Claims, 28 Drawing Sheets

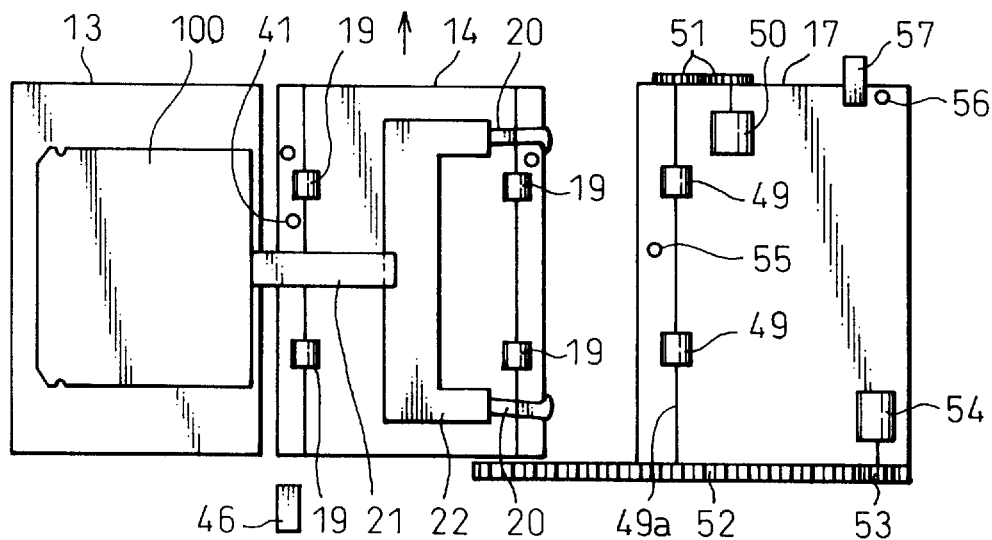
Fig.9D
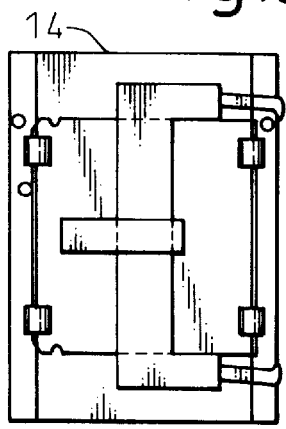
Fig.9E
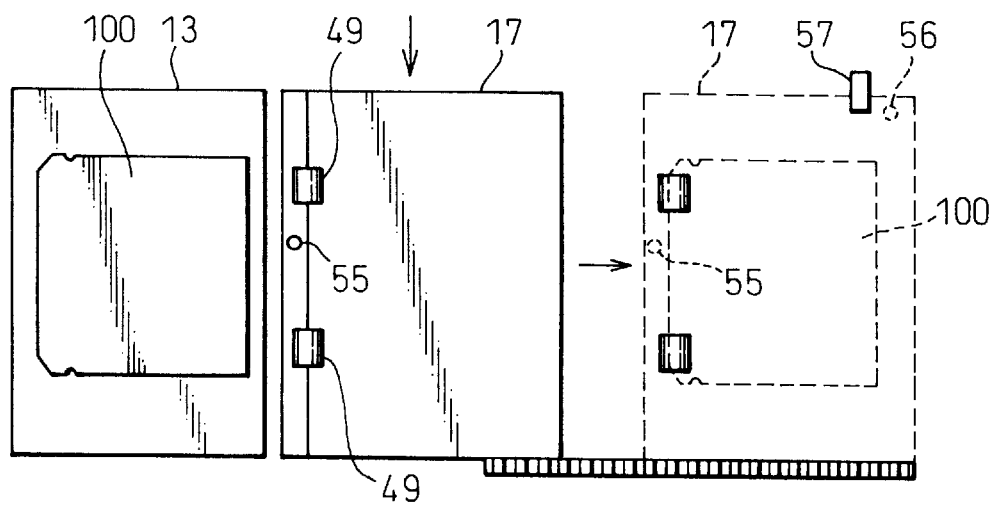

A: REFERENCE POSITION
P: ADJUSTED POSITION

MOVING →
RETURNING ←
INCHING BY d/x ⇢

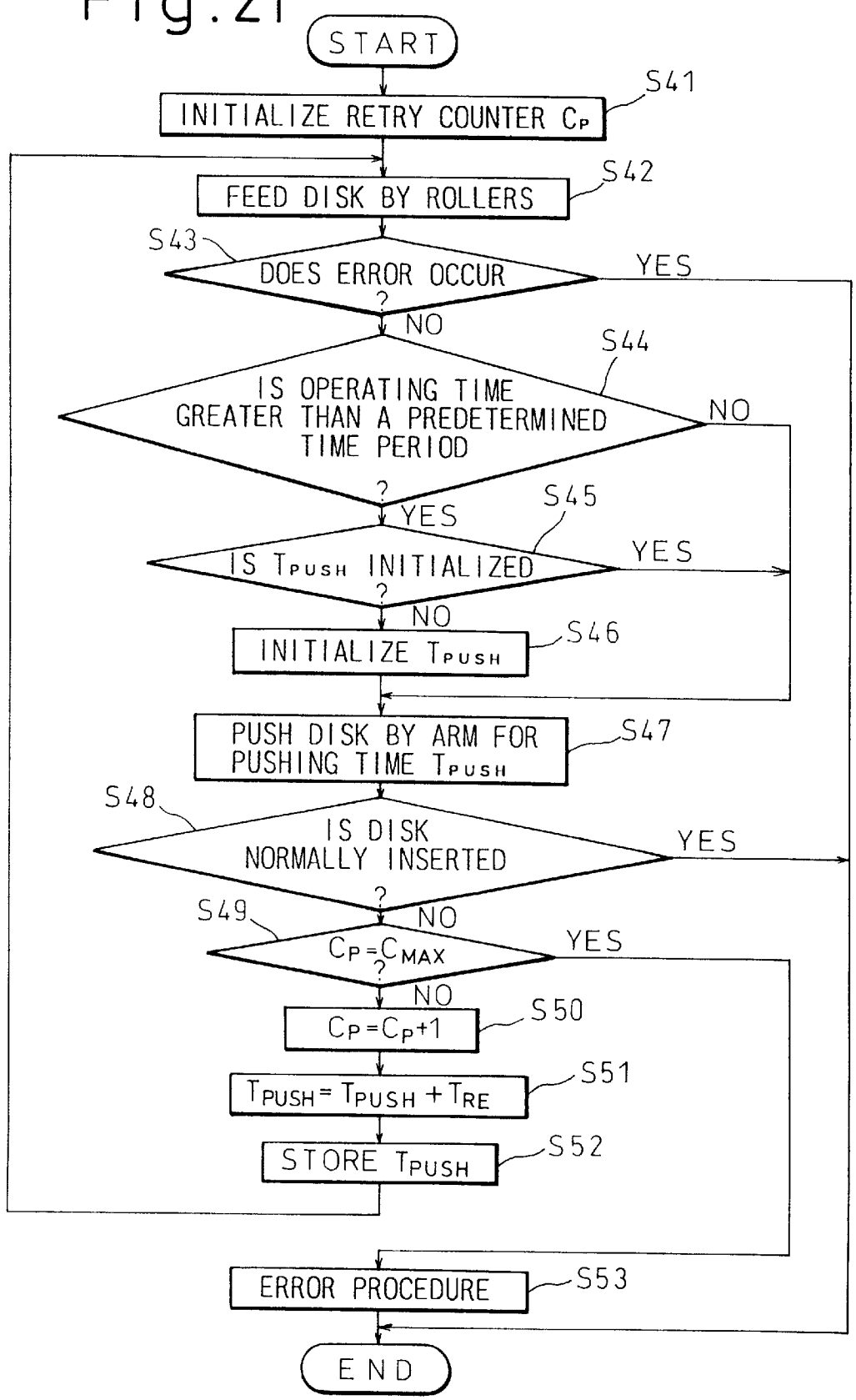

| $t$ | $T_{PUSH}$ |
|---|---|
| $t_1$ | $T_1$ |
| $t_k$ | $T_k$ |
| $t_n$ | $T_n$ |

JUKEBOX WITH CONTROL SYSTEM TO RETRY TRANSFER IF MISALIGNMENT

BACKGROUND OF THE INVENTION

1. Field of the Invention

The present invention relates to a jukebox apparatus, and in particular, the present invention relates to a jukebox apparatus having a retry control system for transferring a data storing device between a carriage and a magazine and between the carriage and a drive unit.

2. Description of the Related Art

Electronic filing systems have been developed which use large capacity data storing devices such as optical or magnetic diskas. Electronic filing systems include jukebox apparatuses or library apparatuses accommodating a plurality of optical or magnetic disks therein so that one of the optical or magnetic disks can be selected and used in a drive unit.

A known jukebox apparatus includes a magazine having a plurality of slots for accommodating data storing devices (disks) therein, a drive unit having a slot for receiving a selected disk and a read/write head, and a conveying device for conveying a disk between the magazine and the drive unit. Such a jukebox apparatus is proposed in Japanese Patent Application No. 5-244935, filed Sep. 30, 1993, by the assignee of the present case. This jukebox apparatus includes a magazine, a drive unit, a conveying device, and a temporary storage unit.

The conveying device includes a carriage for conveying a disk between the magazine and the drive unit along a predetermined conveying path. The carriage has a transferring device for transferring a disk between the carriage and the magazine and between the carriage and the drive unit. In the above described Japanese Patent Application, the transferring device comprises a pair of gripping arms, pairs of pinch rollers, and a pushing arm. The temporary storage unit is arranged oppositely to the drive unit so that the temporary storage unit is moved between a transfer position in front of the drive unit and an escape position in which the temporary storage unit is retracted from the conveying path of the carriage so that the carriage can convey a disk to the drive unit.

When one disk is used in the drive unit and a new disk is requested, i.e., when the disk change is requested, the temporary storage unit is moved to the transfer position and the old disk is transferred from the drive unit to the temporary storage unit. The temporary storage unit is then moved to the escape position, and the carriage conveys a new disk from the magazine to the drive unit. Therefore, it is possible to quickly change the disks. After the new disk is transferred from the carriage to the drive unit, the old disk is transferred from the temporary storage unit to the carriage and the carriage conveys the old disk to the magazine. The old disk is then transferred from the carriage the magazine.

In this jukebox apparatus, the carriage is moved to a reference position in front of the magazine or the drive unit when the carriage conveys a disk to the magazine or the drive unit for transferring the disk. The reference position is predetermined, and the carriage is directly moved to the reference position. However, mechanical components are not always accurately fabricated and assembled, so the predetermined reference position is not always an optimum position to transfer a disk. If the reference position is not appropriate, there may be a problem that the disk cannot be transferred between the carriage and the magazine or the drive unit.

Further, when a disk is transferred from the carriage to the drive unit, the disk is first advanced by the pinch rollers and then pushed by the pushing arm. When the disk is fully locked into the slot of the drive unit, the disk is locked in the drive unit. The pushing arm is operated for a predetermined pushing time. However, if the pushing time is too long, the disk is excessively pushed and the drive unit may be damaged or the drive unit may make noise. If the pushing time is too short, the disk is insufficiently pushed and the drive unit may fail to lock the disk.

Therefore, it is necessary to select the pushing time so that the disk is appropriately set in the drive unit and an undesirable load is not applied to the drive unit. However, in this case too, there is a problem of an inaccuracy of mechanical components and assemblies, so it is difficult to select an optimum pushing time. In addition, a change in temperature during use may make it difficult to determine an optimum pushing time.

Further, the temporary storage unit is usually maintained at the escape position. However, if vibration occurs in the jukebox apparatus, for example, the temporary storage unit may be undesirable moved and displaced away from the escape position toward the conveying path of the carriage. A problem may occur if the temporary storage unit is displaced away from the escape position and projects into the conveying path when the carriage is moving toward the drive unit. In addition, if the temporary storage unit is not exactly placed at the transferring position when the disk is transferred from the drive unit to the temporary unit, a disk may not be transferred.

SUMMARY OF THE INVENTION

The object of the present invention is to provide a jukebox apparatus in which a data storing device can be reliably transferred between a carriage and a magazine or a drive unit by automatically adjusting a reference position of the carriage relative to the magazine or the drive unit.

Another object of the present invention is to provide a jukebox apparatus in which a pushing time of a pushing arm for transferring a data storing device from a carriage to a drive unit can be automatically selected.

A further object of the present invention is to provide a jukebox apparatus in which the position of a temporary storage unit is monitored.

A still further object of the present invention is to provide a jukebox apparatus in which cleaning of the driving unit can be carried our periodically and at a desired time.

According to the present invention, there is provided a jukebox apparatus comprising a magazine having a plurality of slots for accommodating data storing devices therein, a drive unit having a slot for receiving a selected data storing device, and conveying means including a carriage for conveying a data storing device between the magazine and the drive unit along a predetermined conveying path, the carriage having a device transferring means for transferring a data storing device between the carriage and the magazine and between the carriage and the drive unit. The jukebox apparatus is characterized in that it also comprises detecting means for detecting whether a data storing device is transferred or not, and control means responsive to the detecting means for controlling the carriage and the device transferring means such that a data storing device is transferred when the carriage is conveyed to a reference position in front of one of the magazine and the drive unit, and the data storing device is transferred again by displacing the carriage from the reference position when the detecting means detects that a data storing device is not transferred.

In this arrangement, a data storing device is transferred when the carriage is conveyed to a reference position in front of one of the magazine and the drive unit, but when the detecting means detects that a data storing device is not transferred, the data storing device is transferred again after the carriage is displaced from the reference position.

In this arrangement, when a data storing device is to be transferred between a carriage and a magazine or a drive unit and the first transferring action is not successful, the data storing device transfer is tried again, that is a retry of transferring the data storing device is carried out, by displacing the carriage. Therefore, the data storing device can be transferred between the carriage and the magazine or the drive unit, without an error message.

Preferably, the data storing device is repeatedly transferred by displacing the carriage at an interval from the reference position to a position where the detecting means detects that the data storing device is transferred. Also, the reference position is renewed depending on the position where the data storing device is transferred. It is possible that the carriage is further displaced at a displaced position alternatingly in one direction and in the reverse direction.

Preferably, upon adjustment of the apparatus, the control means is arranged such that a data storing device is repeatedly transferred by displacing the carriage from a predetermined position in front of one of the magazine and the drive unit in one direction to a first error position where a transfer error is detected and in the reverse direction to a second error position where a transfer error is detected, and an adjusted position is calculated depending on at least one of the first and second error positions.

In this case, preferably, the data storing device is repeatedly transferred by displacing the carriage at a predetermined interval in one direction from the predetermined position to a third error position where a transfer error is detected and by returning the carriage to a former position where the carriage has passed just prior to the third error position, the data storing device is then repeatedly transferred by displacing the carriage at an interval corresponding to a fraction of the predetermined interval from the former position toward the third error position to a fourth error position where a transfer error is detected, and the adjusted position is calculated depending on the fourth error position. Otherwise, the carriage is returned to the predetermined position when the data storing device is finally transferred from the carriage to the magazine.

Preferably, when the data storing device is transferred from the carriage to the drive unit upon adjustment of the apparatus, the data storing device is returned from the drive unit to the carriage without the data storing device being locked in the drive unit.

Preferably, an adjustable range of the displacement of the carriage is predetermined, and the adjusted position is calculated depending on at least one end of the adjustable range when a transfer error is not detected within the adjustable range.

Also, it is preferable that an adjustable range of the displacement of the carriage is predetermined, and the data storing device is repeatedly transferred by displacing the carriage at a predetermined interval in one direction to the first error position where a transfer error is detected and in the reverse direction a distance slightly smaller than the adjustable range and then at the predetermined interval to an error position where a transfer error is detected.

Also, it is preferable that an adjustable range of the displacement of the carriage is predetermined, the data storing device is repeatedly transferred by displacing the carriage at a predetermined interval in one direction to the first error position where a transfer error is detected, and the adjusted position is calculated depending on the first position and the adjustable range.

Also, it is preferable that when the adjusted position for a certain slot of the magazine is obtained, the adjusted position for another slot of the magazine is obtained depending on the adjusted position and the predetermined position for the certain slot.

Preferably, the magazine is arranged on one side of the travelling path and the drive unit is arranged on the other side of the travelling path. Preferably, the jukebox apparatus further comprises a temporary storage unit arranged on the opposite side of the drive unit from the travelling path and movable between a transfer position in which a data storing device can be transferred between the drive unit and the temporary storage unit and an escape position in which the temporary storage unit is retracted from the conveying path of the carriage.

Preferably, the device transferring means comprises a pair of gripping arms supported by the carriage for movement toward and away from the magazine to transfer a data storing device between the carriage and the magazine, pairs of pinch rollers rotatably supported by the carriage to move and hold a data storing device, a pushing arm movably attached to the carriage for movement toward and away from the drive unit to push a data storing device into the drive unit, and actuating means for actuating the gripping arms, the pinch rollers and the pushing arm.

In this case, preferably, the actuating means includes a first motor for rotating the pinch rollers, and a second motor for moving the gripping arms and the pushing arm via an actuating mechanism including an actuating plate, the actuating mechanism being arranged such that the gripping arms are moved toward the magazine when the actuating plate is moved from an initial position to a first position in one direction, the gripping arms are moved away from the magazine when the actuating plate is moved from the first position to the initial position in the reverse direction, the pushing arm is moved toward the drive unit when the actuating plate is moved from the initial position to a second position in the reverse direction, and the pushing arm is moved away from the drive unit when the actuating plate is moved from the second position to the initial position in the one direction.

Also, it is preferable that the temporary storage unit comprises a movable body and pairs of pinch rollers rotatably supported by the movable body to transfer and hold a data storing device.

Also, it is preferable that the control means controls the actuating means such that the pushing arm is moved toward the drive unit to push a data storing device for a pushing time after a data storing device is transferred from the carriage to the drive unit.

Also, it is preferable that the jukebox apparatus further comprises a second detecting means for detecting whether a data storing device is inserted in the drive unit or not, and wherein a retry of the device insertion is carried out by increasing the pushing time.

The pushing time is preferably renewed depending on a value of the pushing time when a data storing device is inserted in the drive unit. Also, it is preferable that the pushing time is initialized when the operating time of the apparatus exceeds a predetermined value.

Preferably, upon adjustment of the apparatus, a data storing device is repeatedly inserted from the carriage to the drive unit by increasing the pushing time when a data storing device is not normally inserted in the drive unit and by maintaining the pushing time unchanged when a data storing device is normally received by the drive unit, and the pushing time when a data storing device is normally inserted during a plurality of consecutive trials is stored as a value of the pushing time in the use of the apparatus.

Preferably, an initial pushing time is from when the pushing arm starts to move to when the pushing arm reaches a predetermined point, and the pushing time is determined depending on this initial pushing time.

Preferably, the jukebox apparatus further comprises third detecting means for normally detecting whether the temporary storage unit is moved away from the escape position while the temporary storage unit should be maintained in the escape position.

Preferably, the temporary storage unit is moved back to the escape position, when the third detecting means detects that the temporary storage unit is moved away from the escape position or thereafter.

Preferably, when the third detecting means detects that the temporary storage unit is moved away from the escape position while the carriage is stopped, a return flag is set to move back the temporary storage unit to the escape position upon the start of the movement of the carriage.

Preferably, the jukebox apparatus further comprises a fourth detecting means arranged on the temporary storage unit for detecting whether a data storage device ejected from the drive unit is received by the temporary storage unit, the temporary storage unit being moved toward the drive unit to retry a transfer of a data storage device when the temporary storage unit fails to receive a data storage device from the drive unit in the transfer position.

Preferably, the control means further controls the drive unit and the carriage to carry out a periodic cleaning of the drive unit and an optional cleaning. In this case, the optional cleaning is preferably carried out when a read or write error is detected in the drive unit.

BRIEF DESCRIPTION OF THE DRAWINGS

The present invention will become more apparent from the following description of the preferred embodiments, with reference to the accompanying drawings, in which:

FIGS. 9A to 9E are views illustrating the operation of the jukebox apparatus of FIGS. 1 to 8;

FIG. 21 is a flow chart for controlling the pushing arm of FIGS. 20A to 20G;

DESCRIPTION OF THE PREFERRED EMBODIMENTS

Figure 1:
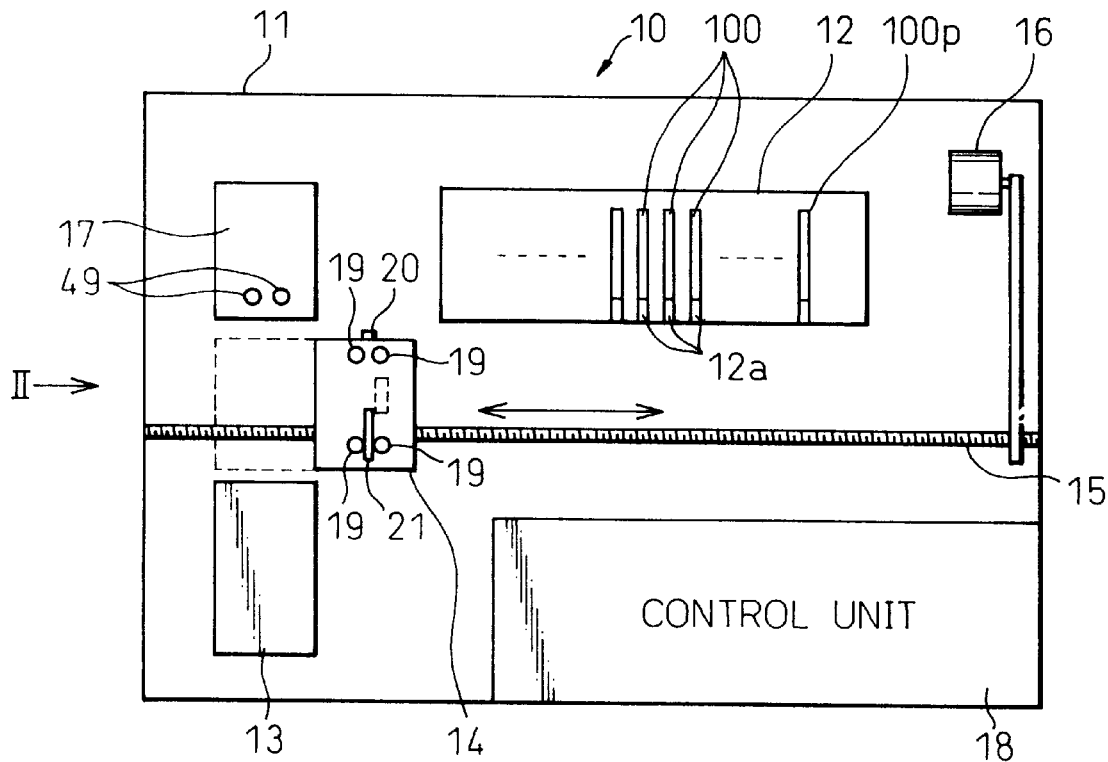
FIG. 1 is a plan view of the jukebox apparatus according to the present invention.
Figure 2:
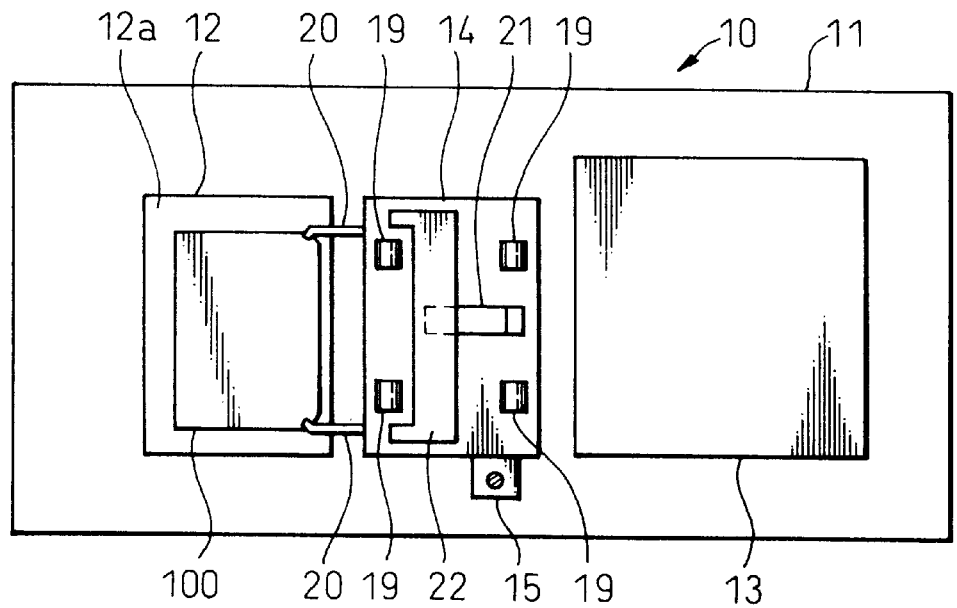
FIG. 2 is an end view of the jukebox apparatus of FIG. 1 when the carriage is in front of the magazine and the temporary storage unit is deleted, viewed in the direction of the arrow II in FIG. 1.

Referring to FIGS. 1 and 2, the jukebox apparatus 10 according to the present invention comprises a rectangular parallele piped casing 11 in which a magazine 12, a drive unit 13, and a carriage 14 are housed. A feed screw 15 extends centrally in the casing 11. The magazine 12 has a plurality of slots 12a for accommodating data storing devices or optical or magnetic disks 100 therein. One of the disks 100p is a head cleaning disk. The drive unit 13 has a slot for receiving a disk 100 and a read/write head (not shown), for example. The carriage 14 has a nut 24 (see FIG. 3) which engages with the feed screw 15 which is driven by a motor 16.

Therefore, the carriage 14 is movable between the magazine 12 and the drive unit 13 along the conveying path defined by the feed screw 15, as shown by the arrow in FIG. 1. The magazine 12 is arranged on one side of the travelling path and the drive unit 13 is arranged on the other side of the travelling path, as will be clear from FIG. 1. The jukebox apparatus 10 also includes temporary storage unit 17 arranged in an opposite relationship with the drive unit 13. The jukebox apparatus 10 also includes a control unit 18 for controlling the motor 16, the carriage 14, the drive unit 13, and the temporary storage unit 17.

The carriage 14 has disk transferring means comprising a pair of gripping arms 20, four pairs of pinch rollers 19 and a pushing arm 21. The gripping arms 20 are arranged to move toward and away from the magazine 12 to transfer the disk 100 between the magazine 12 and the carriage 13, and the pushing arm 21 is arranged to move toward and away from the drive unit 13 to transfer the disk 100 between the drive unit 13 and the carriage 13. An actuating plate 22 is provided on the carriage 14 to move the gripping arms 20 and the pushing arm 21, as shown in FIG. 2.

Figure 3:
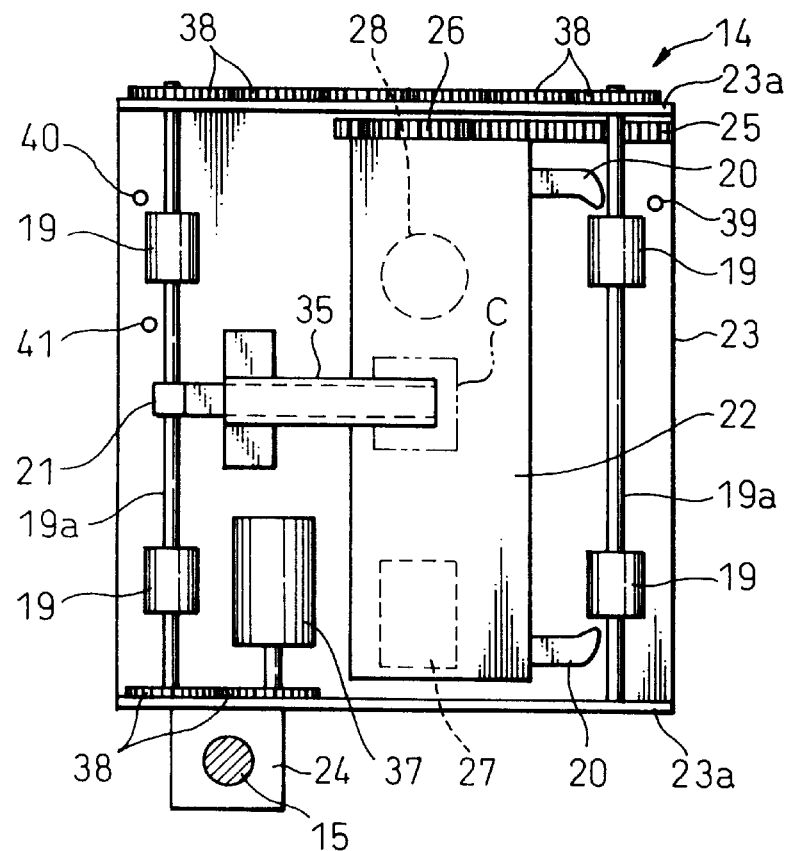
FIG. 3 is a plan view of the carriage of FIGS. 1 and 2.

In FIG. 3, the carriage 14 includes a base plate 23 having a rack 25, on the surface and along one side edge thereof. The actuating plate 22 is movably arranged on the base plate 23 and has a pinion 26 and motors 27 and 28. The motor 27 is connected to the pinion 26 via intervening gears (not shown), and the pinion 26 engages with the rack 25. Therefore, the actuating plate 22 is movable back and forth along the rack 25 by actuating the motor 27.

Figure 4:
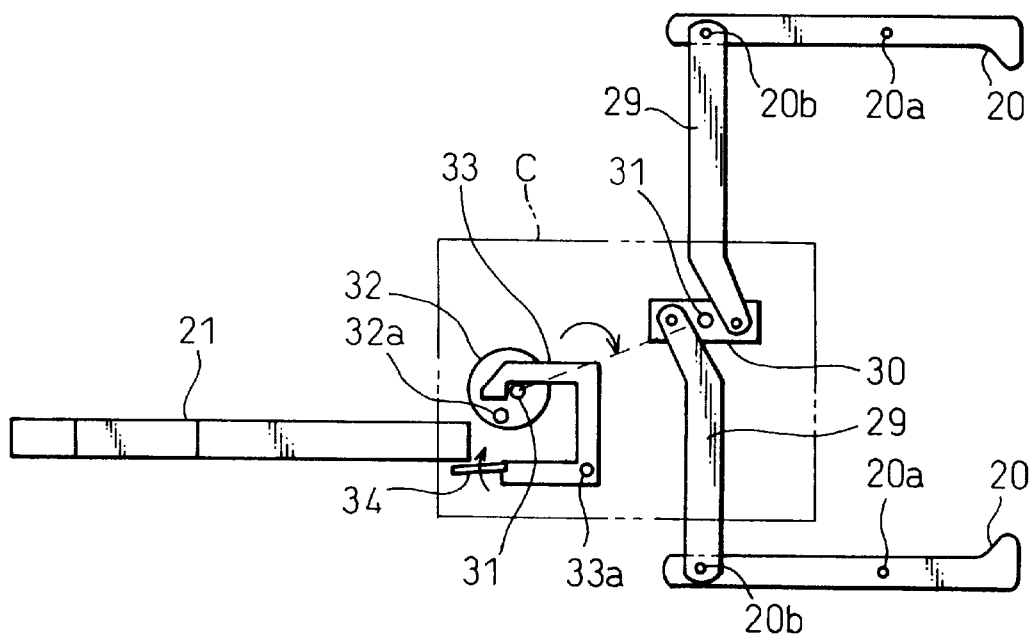
FIG. 4 is a plan view of the gripping arms, the pushing arm and the actuating mechanism arranged on the base plate of FIG. 3.

A clutch device C is provided between the base plate 23 and the actuating plate 22 for operation with the other motor 28. The gripping arms 20 are arranged under the actuating plate 22, and pivotably supported by the actuating plate 22 at pivot pins 20a, as shown in FIG. 4. In FIG. 4, levers 29 are pivotably connected to the gripping arms 20 at pivot pins 20b, respectively, and two levers 29 are interconnected by a center lever 30. The center lever 30 has a shaft 31 fixed thereto, the shaft 31 being operably connected to the motor 28. Therefore, the gripping arms 20 are closed to grip a disk 100 when the shaft 31 is rotated anticlockwise, and the gripping arms 20 are opened to release the gripped disk 100 when the shaft 31 is rotated clockwise.

A clutch plate 32 is coaxially arranged with the center lever 30 and fixed to the shaft 31. The clutch plate 32 has a clutch pin 32a. A U-shaped clutch arm 33 is pivotably supported by the actuating plate 22 at a pivot pin 33a and has an engaging member 34 at one end thereof. The other end of the clutch arm 33 can be pushed by the clutch pin 32a when the clutch plate 32 with the shaft 31 is rotated clockwise, as shown by the arrow, after the gripping arms 20 are opened. Therefore, the engaging member 34 can engage with the pushing arm 21.

Figure 5:
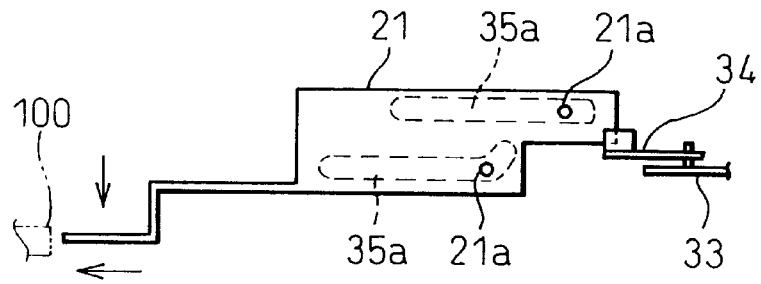
FIG. 5 is a side view of the pushing arm and the engaging member.

The pushing arm 21 is movably inserted in a rectangular sleeve 35 attached to the base plate 23, as shown in FIG. 3. The pushing arm 21 has pins 21a and the angular sleeve 35 has grooves 35a on its sides, as shown in FIG. 5. The pins 21a are passed through the grooves 35a so that the pushing arm 21 is slidably guided in the angular sleeve 35. A front portion of the pushing arm 21 is biased by a spring (not shown) so that the pushing arm 21 is usually tilted up around the top pin 21a. When the engaging member 34 engages with the rear bottom of the pushing arm 21, the engaging member 34 causes the pushing arm 21 to tilt down to bring the pushing arm 21 into a pushing position in which the pushing arm 21 is in alignment with the disk 100. When the actuating plate 22 is moved toward the drive unit 13, the pushing arm 21 follows the actuating plate 22 to push the disk 100.

The pinch rollers 19 are supported by shafts 19a and driven by a motor 37 through gears 38, as shown in FIG. 3. Sensors 39, 40 and 41 are arranged on the front and rear edges of the base plate 23 of the carriage 14. The sensors 39 and 40 detect whether the disk 100 is transferred into the carriage 14 or not, and the sensor 41 detects whether the disk 100 is transferred to the drive unit 13.

Figure 6:
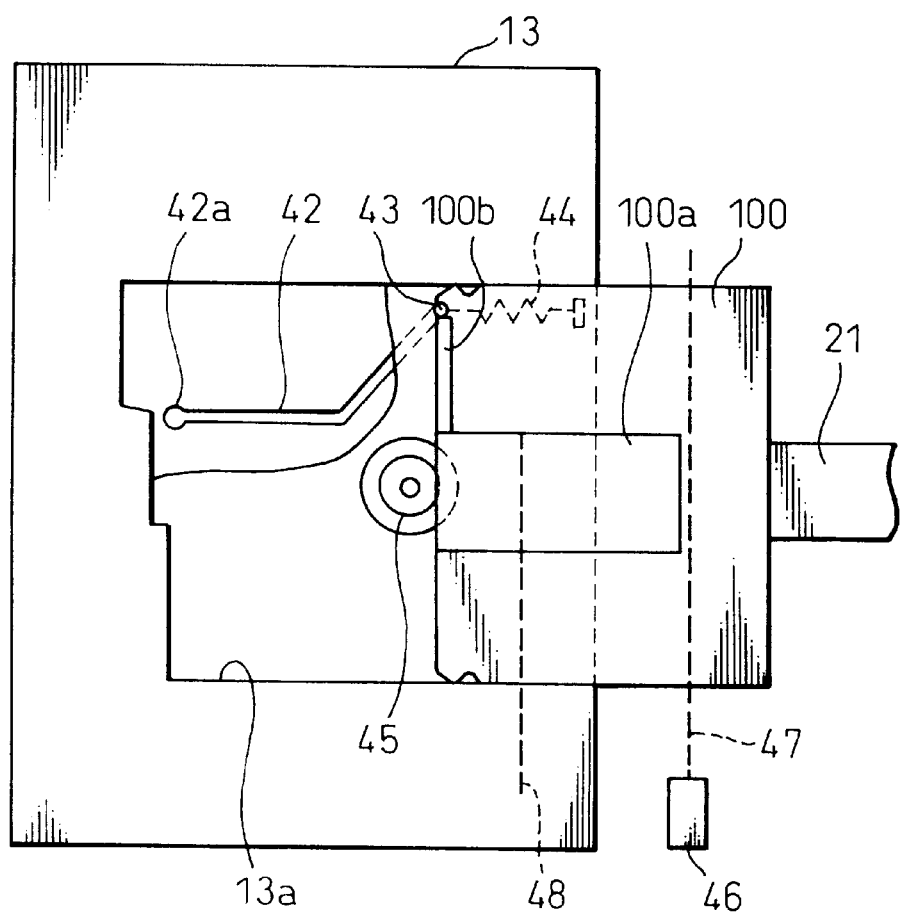
FIG. 6 is a diagrammatic cross-sectional view of the drive unit with a data storing disk partly inserted in the drive unit.

FIG. 6 diagrammatically shows the drive unit 13. The drive unit 13 has a slot 13a into which the disk 100 is inserted. The disk 100 is initially inserted by the pinch rollers 19 and then pushed by the pushing arm 21. The pushing arm 21 continues to push the disk 100 for a pushing time. There is a sensor 46 at a predetermined position near the drive unit 13, and the pushing time starts when the leading end of the pushing arm 21 passes through a line 47 extended from the sensor 46 and finishes when the pushing time is counted down. The pushing arm 21 will be returned when the pushing time is counted down and the leading end of the pushing arm 21 may reach a line 48. The position of the line 48 may change by changing the pushing time.

The drive unit 13 includes a groove 42 in a top or bottom wall of the slot 13a and a movable pin 43 extending through the groove 42. The pin 43 is biased by a spring 44. The disk 100 has a shutter 10a and a slider 100b connected to the shutter 10a. When the pushing arm 21 pushes the disk 100, the slider 100b of the disk 100 engages with the pin 43 and the pin 43 also moves transversely to open the shutter 10a. When the pin 43 reaches the end 42a of the groove 42, the disk 100 is locked by a chucking device (not shown) provided in the drive unit 13. A spindle motor 45 can be seen in FIG. 6. If the pushing arm 21 is stopped and returned before the pin 43 reaches the end 42a of the groove 42, the disk 100 is not locked and is returned to the carriage 14 by the action of the spring 44. This incomplete transfer is detected by the sensor 41 provided on the carriage 14. The pushing operation of the pushing arm 21 is further described later.

The temporary storage unit 17 has two pairs of pinch rollers 49, as shown in FIGS. 1 and 9D. The pinch rollers 49 are supported by shafts 49a and driven by a motor 50 through gears 51. A rack 52 is provided on the inner wall of the casing 11, and the temporary storage unit 17 has a pinion 53 engaged with the rack 52 and driven by a motor 54. Accordingly, the temporary storage unit 17 can be moved back and forth between a transfer position in which the disk 100 can be transferred between the drive unit 13 and the temporary storage unit 17 and an escape position in which the temporary storage unit 17 is retracted from the conveying path of the carriage 14. A sensor 55 is provided to detect whether the disk 100 is transferred from the drive unit 13 to the temporary storage unit 17 or not. A sensor 56 is provided on the temporary storage unit 17 so that the motor 54 is braked when the sensor 56 passes through a wall member 57 provided in the casing 11 at the escape position while the temporary storage unit 17 is retracted. The sensor 56 can be also used as a sensor for detecting whether the temporary storage unit 17 is maintained at the escape position or displaced away from the escape position. The sensors 39–41, 46, and 55–56 are of the type having light emitting elements and light receiving elements.

Figure 7:
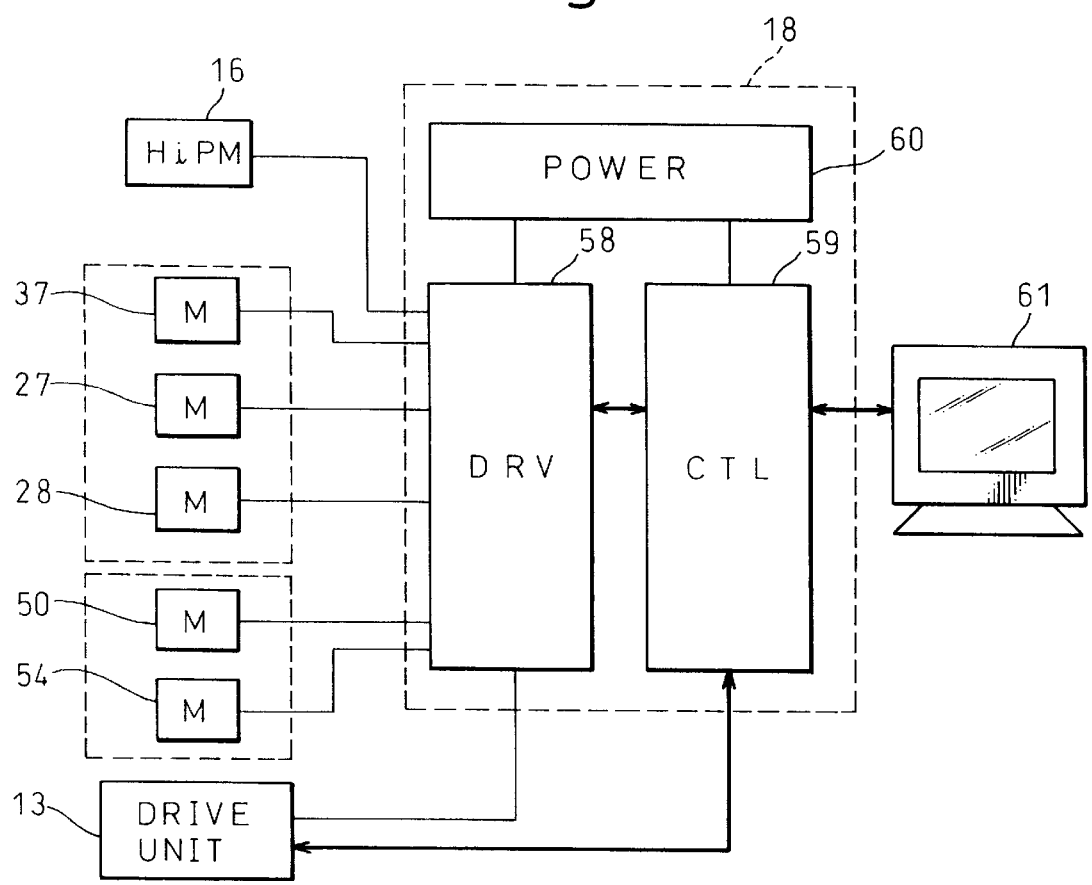
FIG. 7 is a block diagram of the control system of the jukebox apparatus of FIG. 1.
Figure 8:
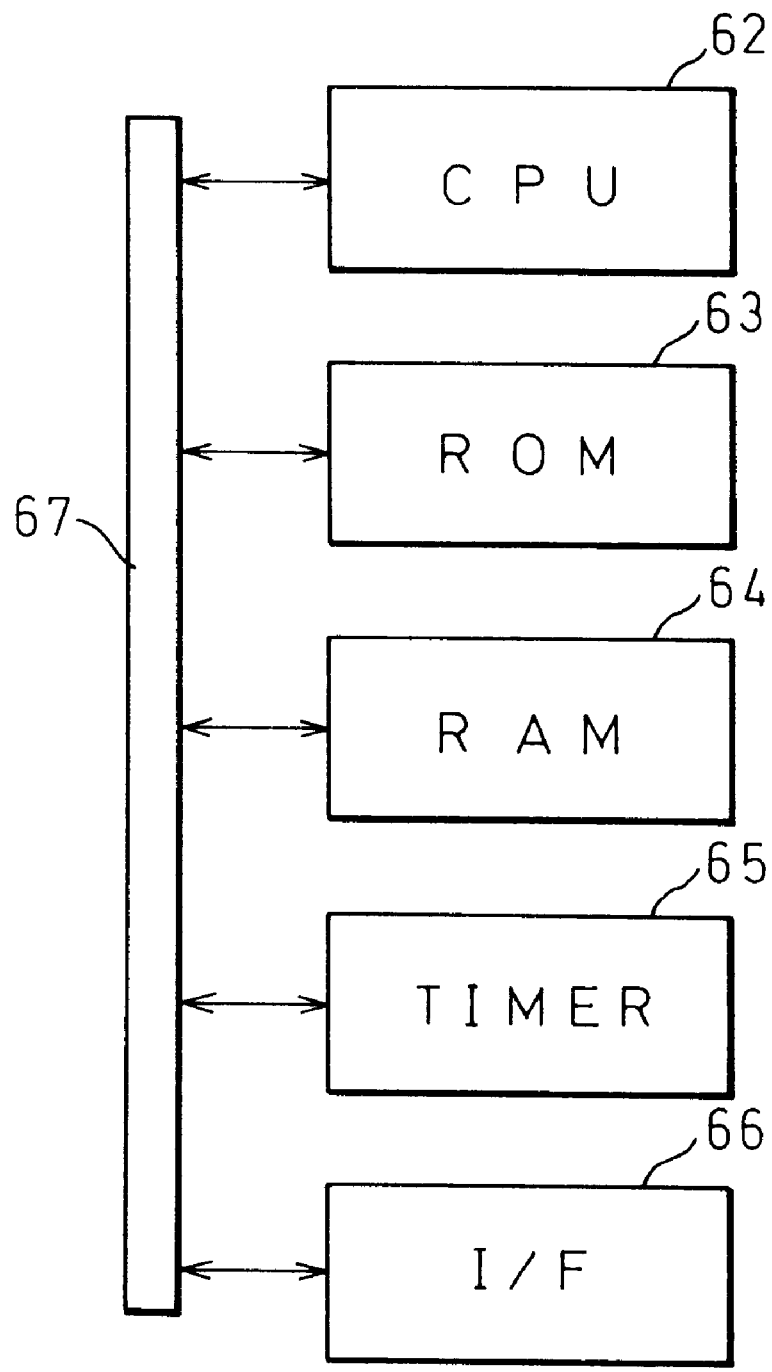
FIG. 8 is a block diagram of the control unit.

Referring to FIG. 7, the control unit 18 includes a driver board 58, a control board 59, and a power supply 60 for inputting outputs from the above described sensors and for controlling the above described motors and the drive unit 13. The control unit 18 can be connected to a host computer 61. Referring to FIG. 8, the control unit 18 can be constituted by a computer system including a central processing unit (CPU)

62, a read only memory (ROM) 63, a random access memory (RAM) 64, a timer 85, an I/O interface 66, and a bus interconnecting these elements.

Figure 9A:
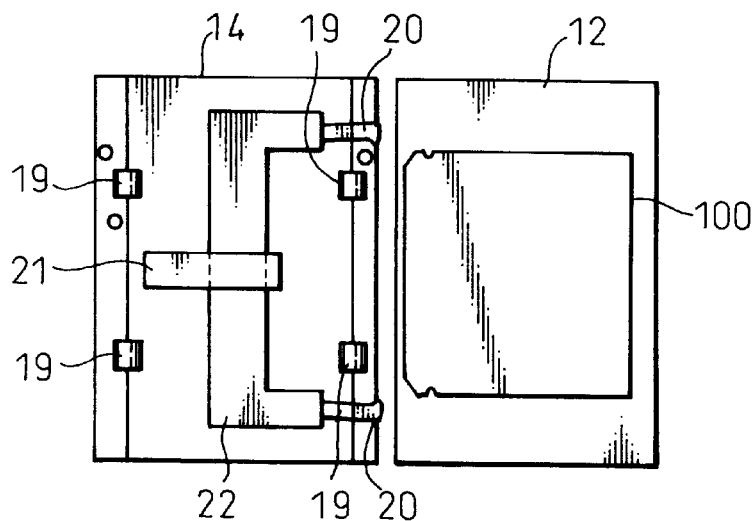
Figure 9B:
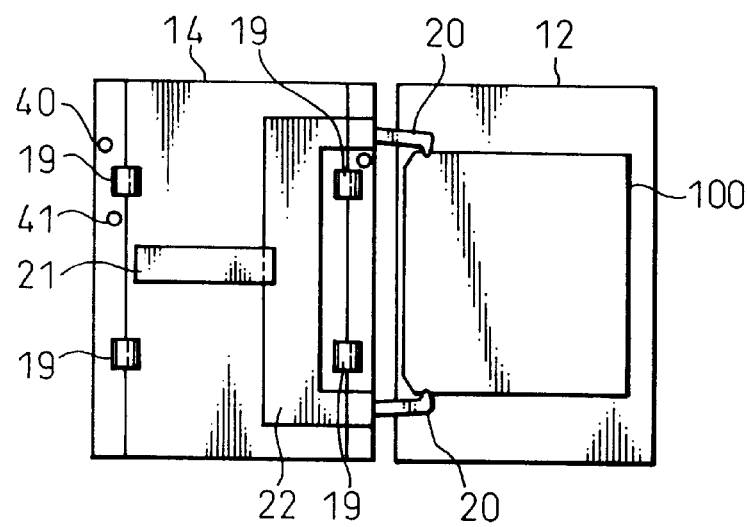
Figure 9C:
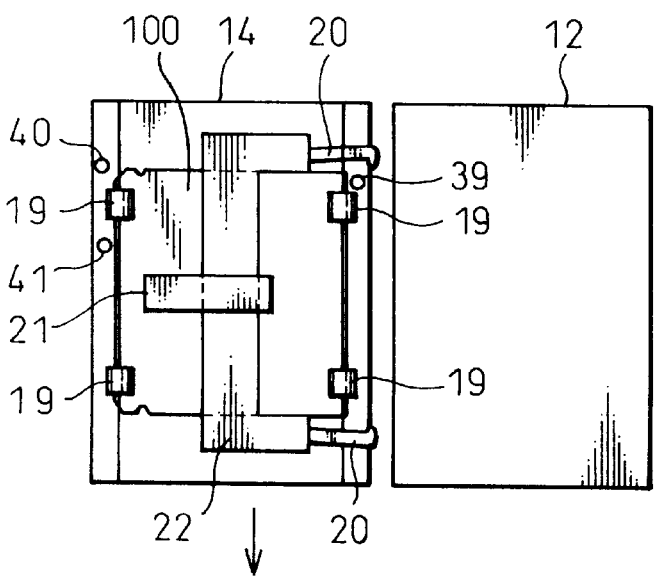

FIGS. 9A to 9E show the fundamental operation of the jukebox apparatus 10. The carriage 14 is conveyed to a reference position in front of a selected slot 12a of the magazine 12, as shown in FIG. 9A. The gripping arms 20 with the actuating plate 22 are moved toward the magazine 12, and the gripping arms 20 are closed to grip a disk 100, as shown in FIG. 9B. The gripping arms 20 with the actuating plate 22 are then moved away from the magazine 12 to pull the disk 100 from the magazine 12 and to insert the disk 100 into a gap between the pinch rollers 19. The gripping arms 20 are opened to release the disk 100 and the pinch rollers 19 are rotated, as shown in FIG. 9C. When the sensors 39 and 40 detect that the disk 100 is fully inserted in the carriage 14, the pinch rollers 19 are stopped.

The disk 100 is thus held by the pinch rollers 19, and the carriage 14 is moved to a reference position in front of the drive unit 13, as shown in FIG. 9D. The temporary storage unit is at the escape position. The pushing arm 21 is caused to tilt down by the engaging member 34 of the clutch plate 32, so that the pushing arm 21 is ready to push the disk 100. The pinch rollers 19 are first rotated to advance the disk 100 toward the drive unit 13. When the sensor 41 detects the passage of the disk 100, the pinch rollers 19 are stopped and the pushing arm 21 with the actuating plate 22 is moved toward the drive unit 13. The disk 100 is thus fully inserted and locked in the drive unit 13. The engaging member 34 of the clutch plate 32 is then returned to the initial position and the pushing arm 21 with the actuating plate 22 is moved away from the drive unit 13 to the initial position. The carriage 14 is then returned to a reference position in front of the magazine to convey a new disk 100, as shown by the arrow in FIG. 9D.

When the drive unit 13 completes its work and it is required to change the disk 100, the temporary storage unit 17 is moved to the transfer position in front of the drive unit 13, as shown in FIG. 9E. The old disk 100 is ejected from the drive unit 13 by the eject mechanism (not shown) in the drive unit 13, and the sensor 55 on the temporary storage unit 17 detects that the old disk 100 is ejected. The pinch rollers 49 are thus rotated to pinch and hold the old disk 100, and the temporary storage unit 17 is moved to the escape position, as shown by the broken line. When the sensor 56 detects that the temporary storage unit 17 is moved to the escape position, the temporary storage unit 17 is stopped and maintained at the escape position.

Therefore, the carriage 14 can be moved to the reference position in front of the drive unit 13 without being obstructed by the temporary storage unit 17, as shown by the arrow in FIG. 9E. A new disk 100 can be then transferred from the carriage 14 to the drive unit 13, in a manner described above. When the pushing arm 21 with the actuating plate 22 is moved away from the drive unit 13 to the initial position on the carriage 14 after the transfer of the new disk 100, the pinch rollers 49 of the temporary storage unit 17 are rotated to transfer the old disk 100 from the temporary storage unit 17 to the carriage 14. The pinch rollers 19 of the carriage 14 are then rotated when the sensor 39 detects the transfer of the old disk 100. The pinch rollers 19 thus hold the old disk 100 and the carriage 14 is moved to the slot 12a of the magazine 12 from which the old disk 100 was taken. The old disk 100 is finally transferred from the carriage 14 to the magazine 12. In this way, it is possible to quickly change the disk 100.

Figure 10:
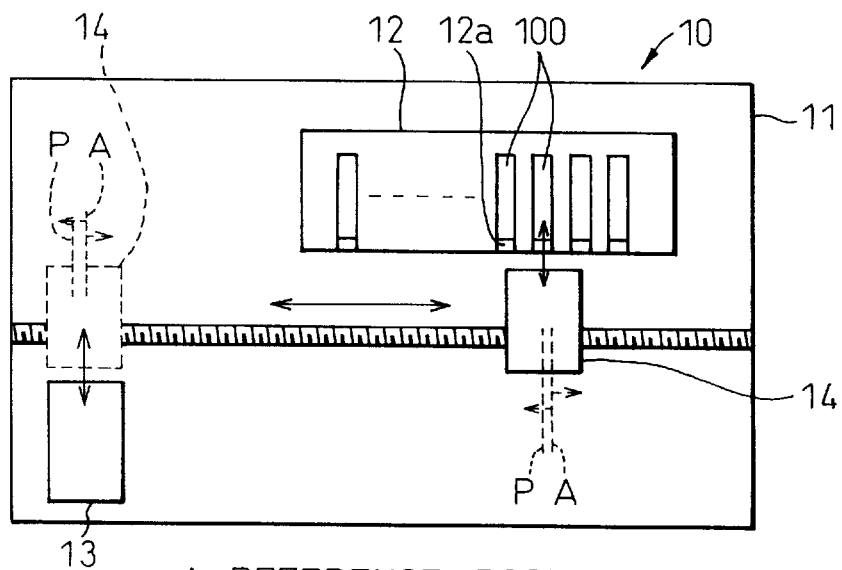
FIG. 10 is a diagrammatic plan view illustrating a transfer of a disk between the carriage and the magazine and a retry of transferring a disk when the disk is not transferred.

FIG. 10 shows the transfer of the disk 100 between the carriage 14 and the magazine 12 while carrying out the retry of transferring the disk 100 when the disk 100 is not transferred. The transfer and the retry between the carriage 14 and the drive unit 13 is also shown by the broken line in FIG. 10. In general, the carriage 14 is moved to a reference position A and a transfer of a disk 100 is carried out between the carriage 14 and the magazine 12, or between the carriage 14 and the drive unit 13. When it is detected that the disk 100 is not transferred, a retry of transferring the disk 100 is carried out by displacing the carriage 14 from the reference position A to a position along the conveying path of the carriage 14. Therefore, the disk 100 can be reliably transferred between the carriage 14 and the magazine 12 or the drive unit 13, without an error message occurring in the apparatus 10. An adjusted position P is also shown in FIG. 10, which will be described later.

The sensor 39, 40 or 41 provided on the carriage 14 can be used as detecting means for detecting whether the disk 100 is normally transferred or not. Preferably, the combination of the sensor output and a timer can detect whether the disk 100 is transferred within a predetermined time or not. It is also possible to use other detecting means. For example, the load of the motor 37 driving the pinch rollers 19 is monitored and it is detected that the disk 100 is not normally transferred when the load becomes greater than a predetermined value.

Figure 11:
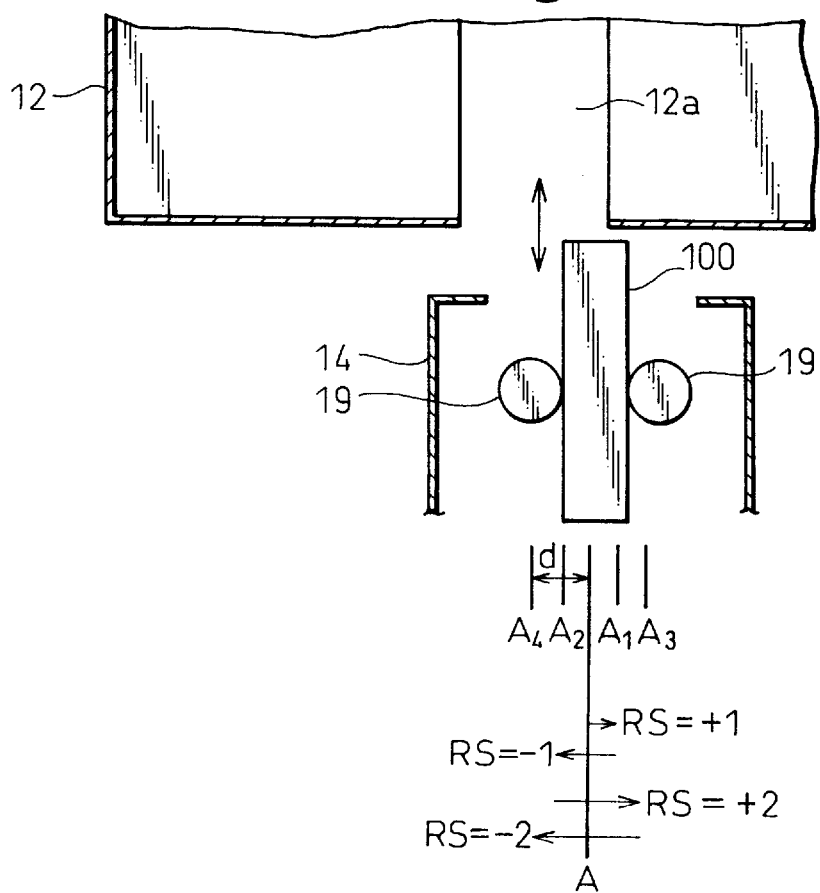
FIG. 11 is an enlarged plan view illustrating the retry of FIG. 10.
Figure 12:
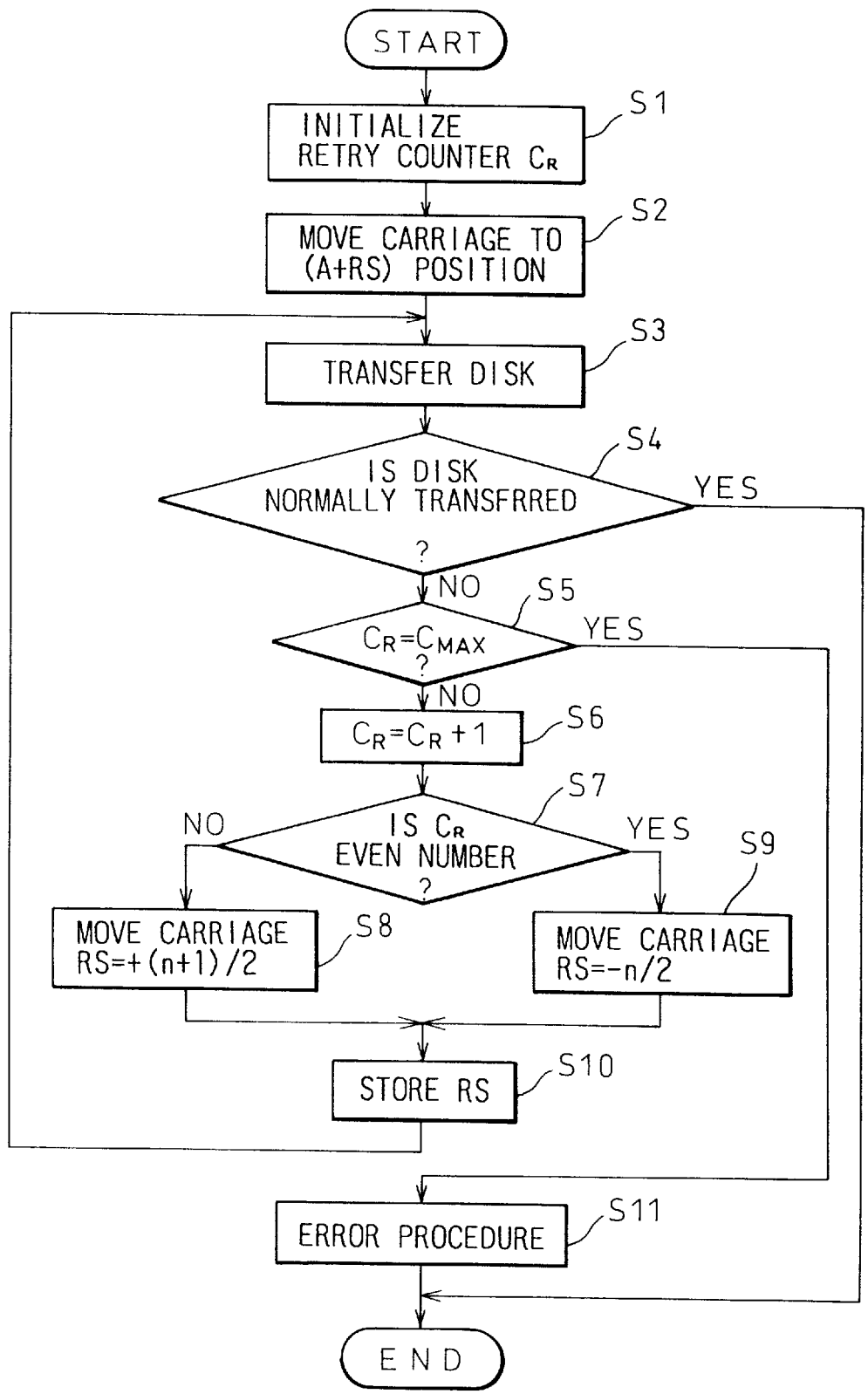
FIG. 12 is a flow chart for carrying out the retry of FIG. 11.

FIG. 11 shows, in greater detail, the transfer of the disk 100 from the carriage 14 to a selected slot 12a of the magazine 12 and the retry of transferring the disk 100 when the disk 100 is not transferred. FIG. 12 shows a flow chart for carrying the retry of FIG. 11. In FIG. 11, the carriage 14 is first moved to the reference position A, and the disk 100 is transferred from the carriage 14 to the magazine 12. If the transfer is not successful, the carriage 14 is displaced to the position $A_1$, and the disk 100 is again transferred, i.e., the retry is carried out. If the transfer is not successful, the carriage 14 is displaced to the position $A_2$, and the retry is carried out. The retry is further carried out by displacing the carriage 14 to the positions $A_3$ and $A_4$ until the disk 100 is normally transferred. In this way, the disk 100 is repeatedly transferred by displacing the carriage 14 at an interval from the reference position A to a position where the disk 100 is transferred. In particular, the carriage 14 is displaced alternatingly in one direction and in the reverse direction.

In step 1 in FIG. 12, a retry counter $C_R$ provided in the control board 59 is initialized. In step 2, the carriage 14 is moved to a selected position (A+RS). "RS" is a displacement step or distance and the initial value thereof is zero. Therefore, the carriage 14 is moved to the reference position A. In step 3, the disk 100 is transferred from the carriage 14 to the magazine 12 to insert the disk 100 into the selected slot 12a by rotating the pinch rollers 19. In step 4, it is determined whether the disk (device) 100 is normally transferred or not. If the result is YES, the transfer process is ended.

If the result is NO in step 4, it is determined whether the retry counter $C_R$ reaches a maximum value $C_{MAX}$ or not in step 5. If the result is YES, the program goes to step 11. If the result is NO, the retry counter $C_R$ is incremented in step 6, and it is determined whether the retry counter $C_R$ is an even number or not in step 7. If the retry counter $C_R$ is an odd number, the program goes to step 8, and the displacement step RS is calculated by the relationship of RS=(n+1)/2. The carriage 14 is moved by the calculated distance in the plus direction. For example, n=1 in the first cycle, so RS=+1. Therefore, the carriage 14 is moved to the position $A_1$ in FIG. 11. The displacement step RS is stored in step 10. If the retry counter $C_R$ is an even number, the program goes to step 9, and the displacement step RS is calculated by the relationship of RS=−n/2. The carriage 14 is moved by the calculated distance in the minus direction. For example, n=2 in the second cycle, so RS=−1. Therefore, the carriage 14 is moved to the position $A_2$ in FIG. 11 in step 2. The displacement step RS is stored in step 10.

The program goes to step 3, and the retry of transferring the disk 100 is repeated by displacing the carriage 14 at an interval, as described above. When it is judged in step 4 that the disk 100 is normally transferred, the program is ended. If it is judged in step 5 that the retry counter $C_R$ reaches the maximum value $C_{MAX}$ before the disk 100 is normally transferred, the program goes to step 11, and an error procedure is carried out.

Since the displacement step RS is stored, the carriage 14 is moved to the position (A+RS) when the carriage 14 is next moved to slot 12a of the magazine 12. That is, the reference position is renewed depending on the position (A+RS) where the disk 100 is previously transferred. For example, when the retry of transferring the disk 100 is previously succeeded at the position $A_4$, the carriage 14 is next moved to the position $A_4$. Therefore, it will be not necessary to carry out the retry of transferring the disk 100 at the next time.

Figure 13:
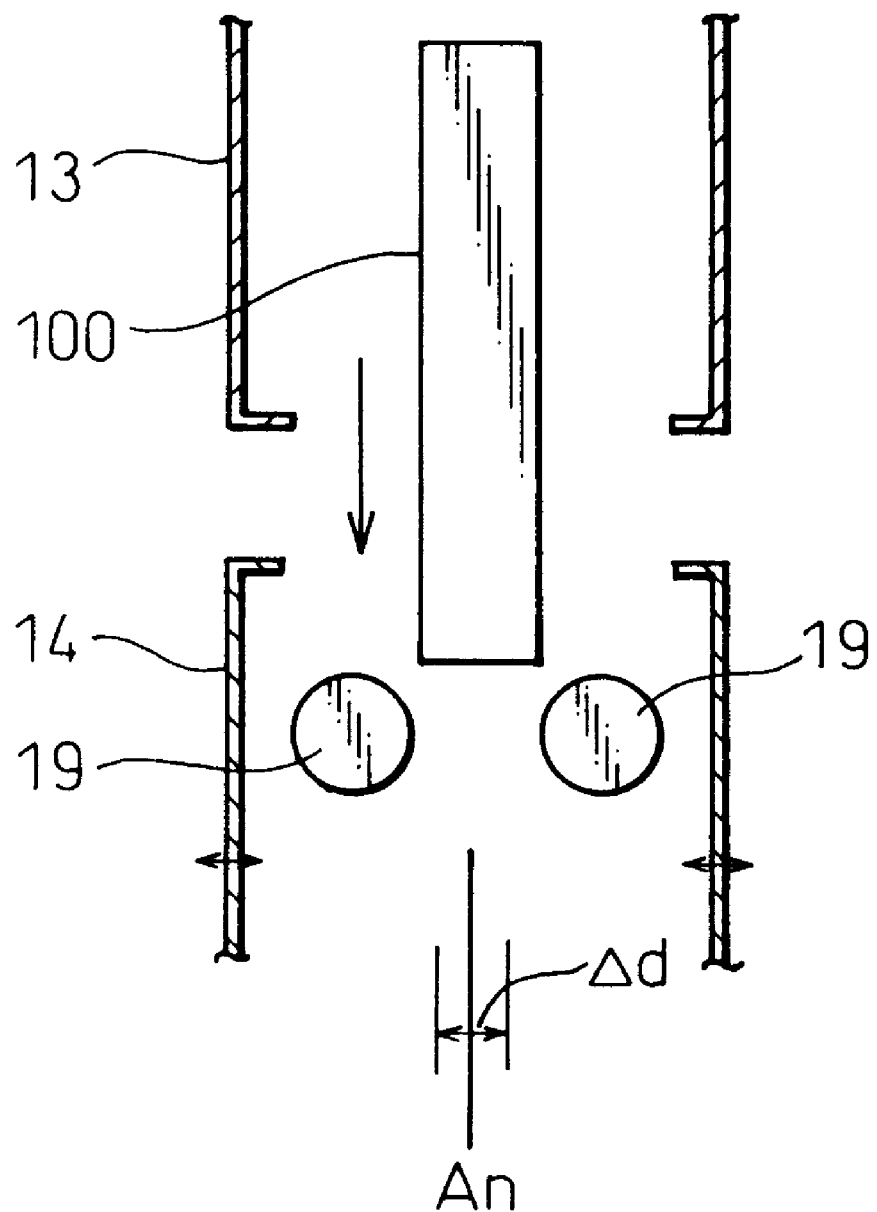
FIG. 13 is a plan view illustrating a retry of transferring a disk between the carriage and the drive unit.
Figure 14:
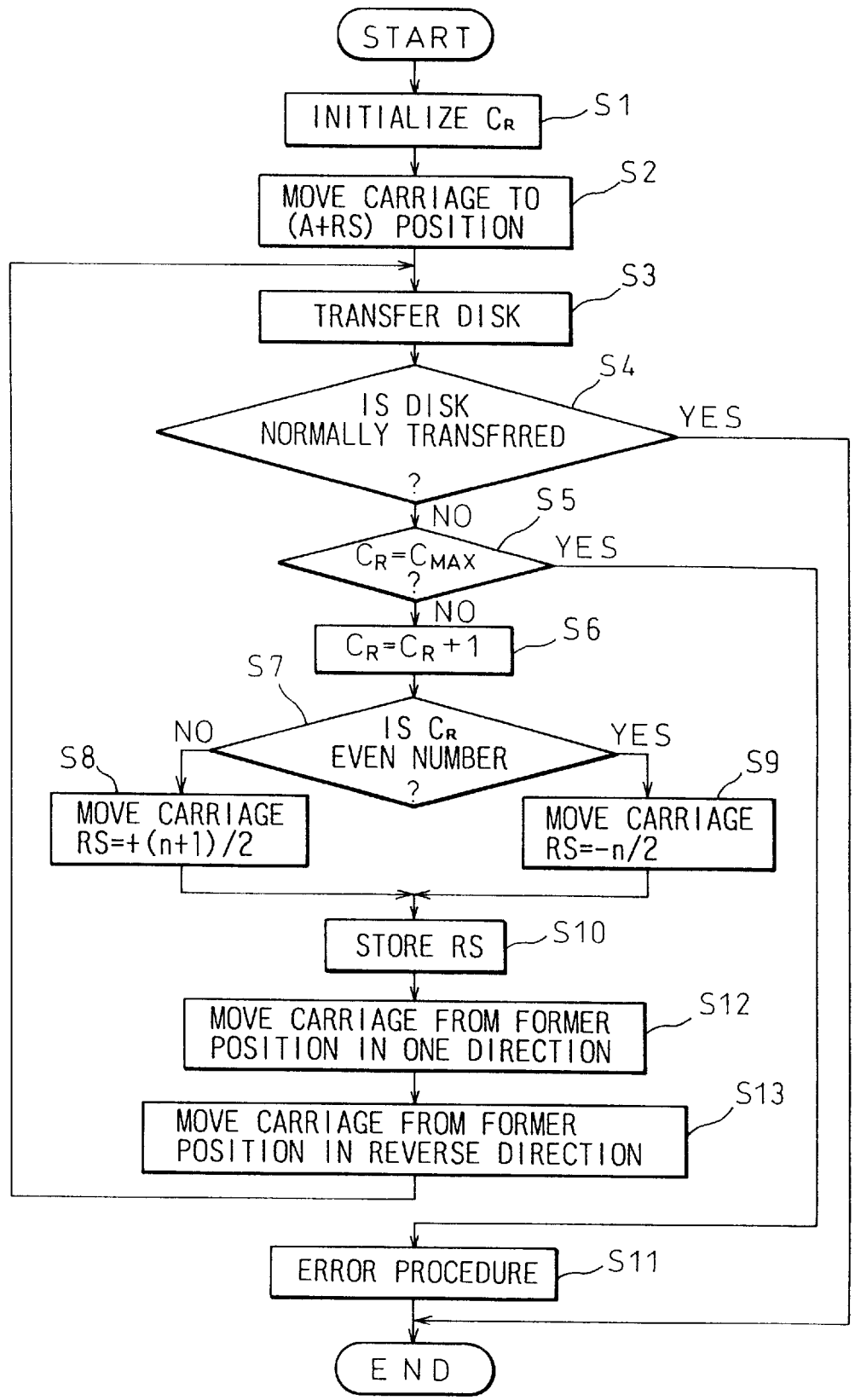
FIG. 14 is a flow chart for carrying out the retry of FIG. 13.

FIG. 13 shows the retry of transferring the disk 100 from the drive unit 13 to the carriage 14, and FIG. 14 is a flow chart for carrying out the retry of FIG. 13. Steps 1 to 11 of FIG. 14 are similar to those of FIG. 12, and the explanation thereof is omitted. FIG. 14 includes steps 12 and 13 after step 10. When the program passes through step 10, the carriage 14 may be displaced to a position $A_n$ of FIG. 13. The carriage 14 is further displaced about the displaced position $A_n$ alternatingly in one direction (step 12) and in the reverse direction (step 13) by a small range of movement Δd, as shown in FIG. 13. Accordingly, it is possible to smoothly transfer the disk 100 from the drive unit 13 to the carriage 14 even when the disk 100 is ejected from the drive unit 13 at a slightly offset position.

Figure 15:
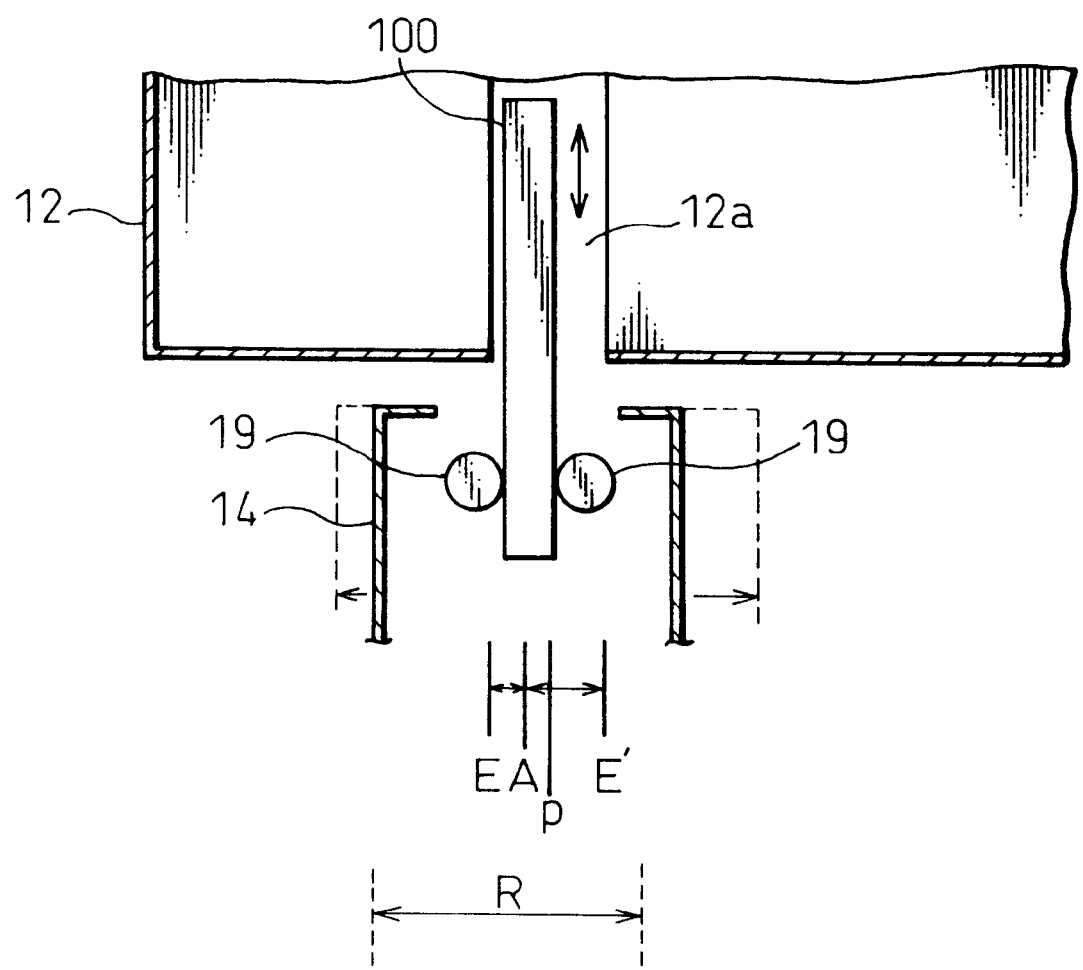
FIG. 15 is a plan view illustrating an example of the retry carried out upon adjustment of the apparatus.
Figure 16:
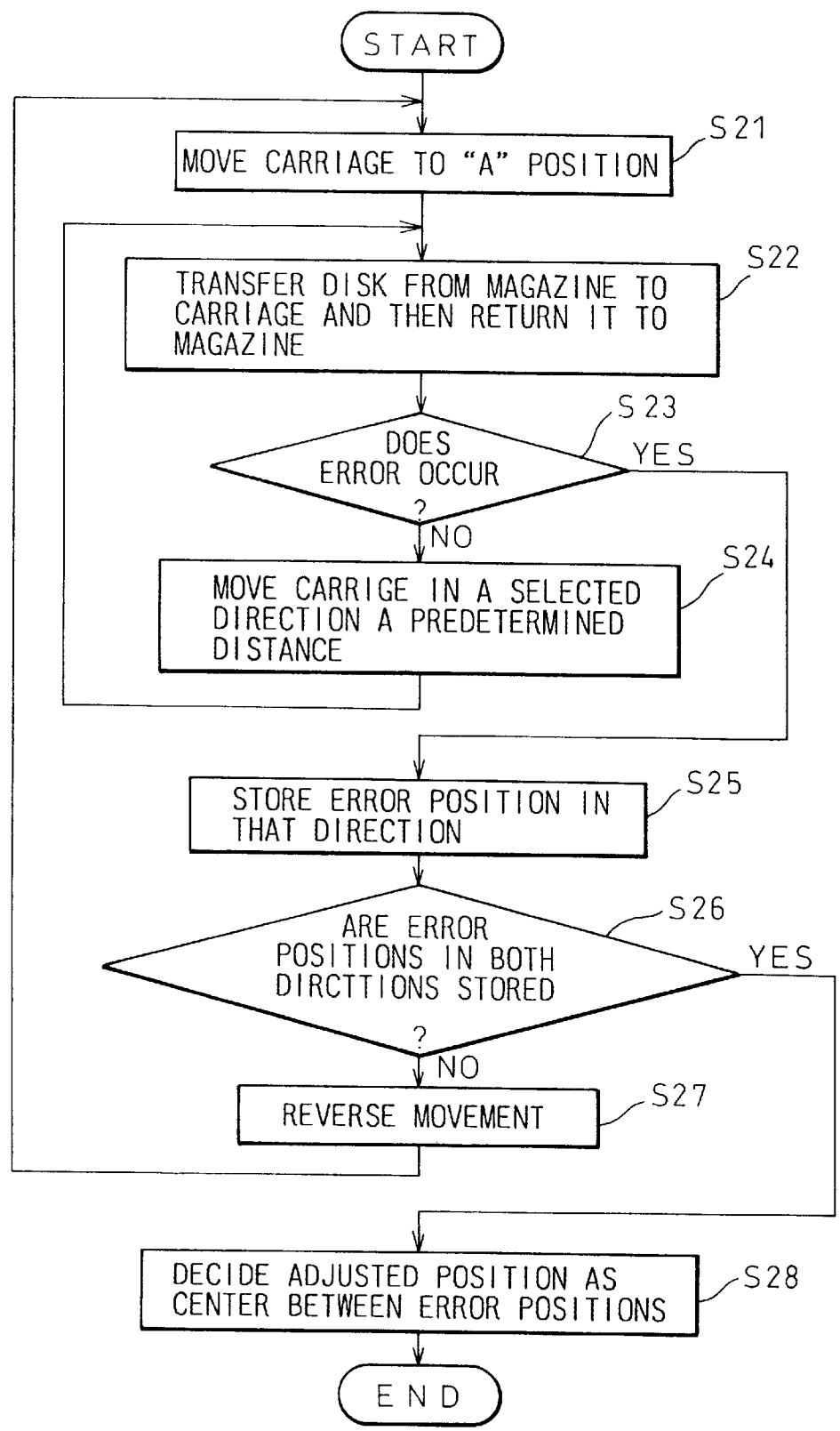
FIG. 16 is a flow chart for carrying out the retry of FIG. 15.

FIG. 15 shows an example of the retry carried out upon an adjustment of the apparatus 10, and FIG. 16 is a flow chart for carrying out the retry of FIG. 15. Adjustment of the apparatus 10 is carried out, for example, after the apparatus 10 is assembled and before the apparatus 10 is transported to a user. The example is described regarding the retry of transferring the disk 100 between the carriage 14 and the magazine 12, it will be apparent that the example can be used in the retry of transferring the disk 100 between the carriage 14 and the drive unit 13.

The carriage 14 is moved to a predetermined position (referred to a reference position A) in front of a selected slot 12a of the magazine 12 in step 21 in FIG. 16, and as shown in FIG. 15. The disk (device) 100 is transferred from the slot 12a to the carriage 14, and the disk 100 is then returned to the slot 12a in step 22. It is determined whether a transfer error occurred, or not, in step 23. If the result is NO (when a transfer error is not detected), the program goes to step 24 and the carriage 14 is displaced in one direction, for example, to the left in FIG. 15. The program then goes to step 22 to repeatedly transfer the disk 100 by displacing the carriage 100 at a predetermined interval. When a transfer error is detected at the position E in FIG. 15, the judgement in step 23 becomes YES and the program goes to step 24 to store the error position E in that direction. In step 26, it is determined whether error positions in both direction stored or not.

In this case, the result of step 26 is NO, and the program goes to step 27 to reverse the movement of the carriage 14 (to the right in FIG. 15). The program goes to step 21 to repeat the transfer of the disk 100 by displacing the carriage 100 at a predetermined interval. When a transfer error is detected at the position E' in FIG. 15, the judgement in step 23 becomes YES and the program goes to step 24 to store the error position E' in that direction. The judgement in step 26 will become YES, and an adjusted position P is decided at the center between the error positions E and E'. The adjusted position P is used as a reference position A while the jukebox apparatus 10 is used. The adjusted position P can be obtained for every slot 12a.

When a transfer error is detected at the beginning of transfer action, the carriage 14 is moved to the left or to the right an appropriate distance, and a retry of transferring the disk 100 is started regarding the new position as a reference position. The retry to decide the adjusted position P is then carried out in a manner described above. The retry is carried out within a predetermined number of trials. If a transfer error is detected when the predetermined number of trials are carried out, an error procedure is effected, and the retry is ended.

The adjusted position P can be decided for every slot 12a, but it is also possible to decide the adjusted position P for every several slots 12a. For example, the retry is carried out regarding "n" slots 12a, and the adjusted positions $P_1$ to $P_n$ are obtained when the reference positions are $A_1$ to $A_n$. The retry is not carried out regarding the remaining slots 12a, and when the reference position for one of those slots 12a is A, the adjusted position for said one slot 12a can be calculated from the following relationship/:

$$\{(P_1-A_1)+(P_2-A_2)+\ldots +(P1_nA1_n\}/2+A.$$

Also, in this example, it is possible to return the disk 100 from the carriage 14 to the reference position of the slot 12a only when the disk 100 is transferred from the carriage 14 to the slot 12a. By doing so, it is possible to avoid a possibility that the disk 100 contacts the wall of the slot 12a and is damaged if the carriage 14 is considerably displaced from the reference position during the adjusting operation.

Figure 17:
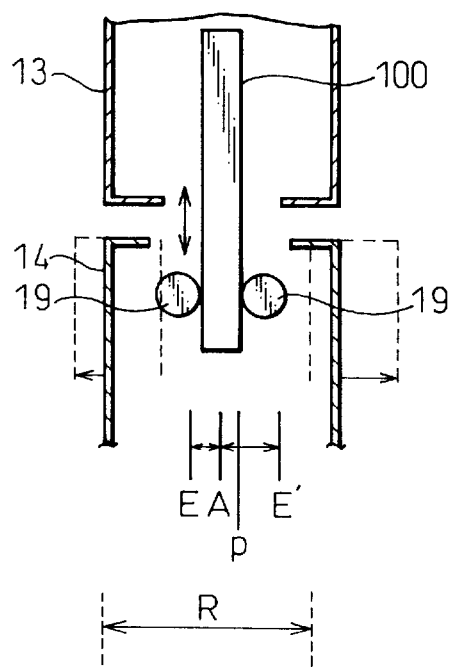
FIG. 17 is a plan view illustrating a further example of the retry carried out upon adjustment of the apparatus.

FIG. 17 shows an example of the retry carried out upon adjustment of the apparatus 10. In this case too, the carriage 14 is moved in one direction to decide an error position E and in the reverse direction to decide an error position E', and an adjusted position P is decided at the center between the error positions E and E'. However, in transferring the disk 100 from the carriage 14 to the drive unit 13, the disk 100 is only partly inserted in the drive unit 13 so that the disk 100 is not locked in the drive unit 13 and returned from the drive unit 13 to the carriage 14. If the disk 100 is fully inserted in the drive unit 13, the disk 100 is locked in the drive unit 13, so a time is consumed to unlock when the disk 100 is returned. Therefore, it is possible to save a time for chucking and unchucking, to thereby shorten the time needed for adjustment.

Figure 18:
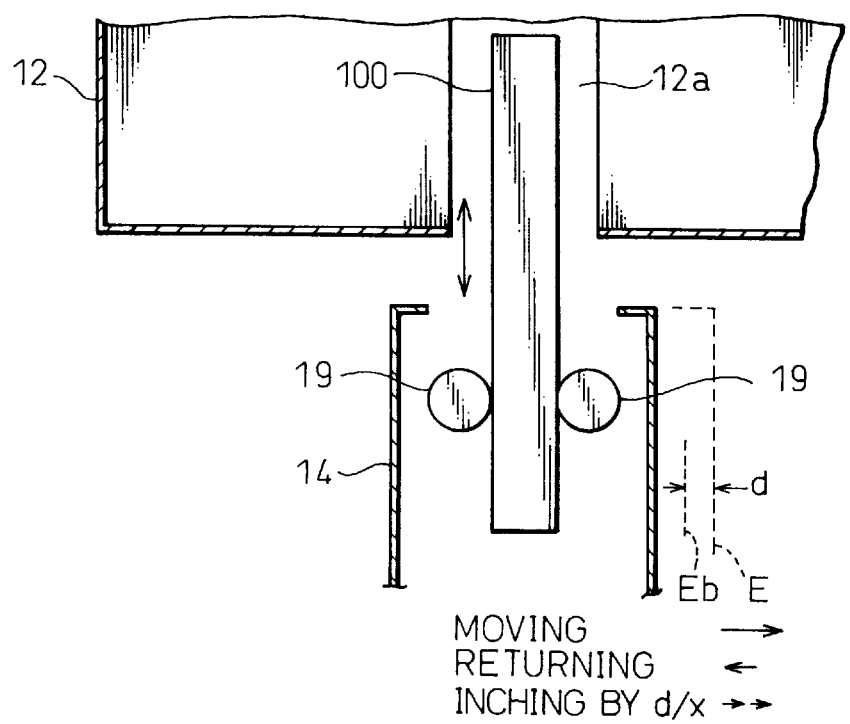
FIG. 18 is a plan view illustrating a further example of the retry carried out upon adjustment of the apparatus.
Figure 19:
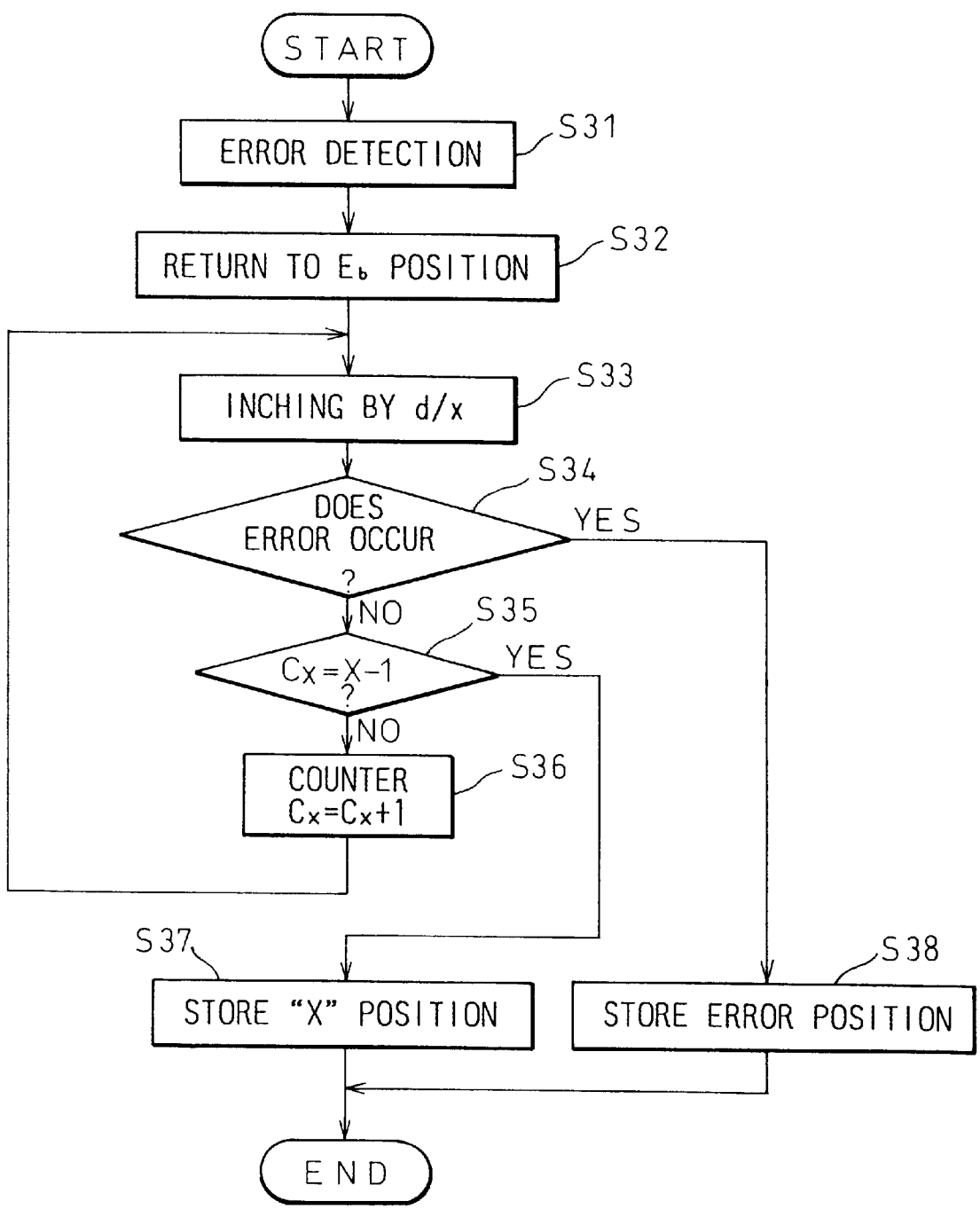
FIG. 19 is a flow chart for carrying out the retry of FIG. 18.

FIG. 18 shows a further example of the retry carried out upon adjustment of the apparatus 10, and FIG. 19 is a flow chart for carrying out the retry of FIG. 18. This example is similar to the example of FIGS. 15 and 16, but it is possible to decide the adjusted position P more precisely.

Error detection is carried out in step 31, in a manner described above with reference to steps 21 to 24 in FIG. 16. That is, the carriage 14 is moved to a reference position A in front of a selected slot 12a of the magazine 12, and if an error is detected while the disk 100 is transferred from the slot 12a to the carriage 14 and then returned to the slot 12a, the carriage 14 is displaced in one direction at a predetermined interval d. It is supposed that a transfer error is detected at an error position E in FIG. 18.

The carriage 14 is returned to a former position $E_b$ where the carriage has passed just prior to the error position E in step 32. The distance between the former position $E_b$ and the error position E is "b". The error detection is then carried out while moving the carriage 14 by d/X (X is a natural number) in steps 33 and 34. That is, the disk 100 is repeatedly transferred by displacing the carriage 14 at an interval corresponding to a fraction of the predetermined interval d from the former position $E_b$ toward the error position E to an intermediate position therebetween. If a transfer error is detected in step 34, the program goes to step 38, and that intermediate position is stored as an adjusted position.

When the result of step 34 is No, the program goes to step 35, and it is determined if the counter $c_x$ has reached (X−1). If the result is NO in step 35, the program goes to step 36, and the counter $c_x$ is incremented. If the result is YES in step 35, the program goes to step 37, and the "X" position corresponding to the error position E is stored as an adjusted position.

It will be possible to obtain the adjusted position P more precisely if the error detection is carried out while the carriage is displaced at a smaller interval from the beginning of the retry, but a considerable amount of time will elapse if the carriage is displaced at a smaller interval from the beginning. According to the present invention, it is possible to obtain the adjusted position P more precisely and in a shorter time if the error detection is carried out while the carriage is displaced at a larger interval at the beginning of the retry and then at a smaller interval once a transfer error is detected. It is also possible to increase a magnifying power of adjustment.

In addition, an adjustable range R of the displacement of the carriage 14 for the adjustment is predetermined, as shown in FIGS. 15 and 17. If the carriage 14 reaches the end of the adjustable range R before a transfer error is detected, that position is stored. The adjusted position P can be calculated depending on the end of the adjustable range R when a transfer error is not detected within the adjustable range R. If the adjustment operation can be carried out within the adjustable range R, the disk 100 can be used without problem. Therefore, adoption of the adjustable range R makes it possible to shorten the time needed for adjustment.

Also, when an adjustable range R of the displacement of the carriage 14 for the adjustment is predetermined, the data storing device is repeatedly transferred by displacing the carriage at a predetermined interval in one direction to the error position E where a transfer error is detected and in the reverse direction a distance slightly smaller than the adjustable range R and then at the predetermined interval to an error position where a transfer error is detected. That is, when the adjustable range R is known and the error position E on one side from the reference position A is known, the error position on the other side from the reference position A can be approximately anticipated. Therefore, it is not necessary to return the carriage to the reference position A, as described with reference to steps 27 and 21, but it is possible to return the carriage to a position on the other side from the reference position A which may be near an error position E'. Therefore, it is possible to shorten a time needed for the adjustment.

Also, if an adjustable range R of the displacement of the carriage 14 is predetermined, the disk 100 is repeatedly transferred by displacing the carriage 24 at a predetermined interval in one direction to the error position E where a transfer error is detected, and the adjusted position P is calculated depending of the error position E and the adjustable range R. For example, the adjusted position P can be calculated by the following relationship. P=E−(R/2).

Figure 20A:
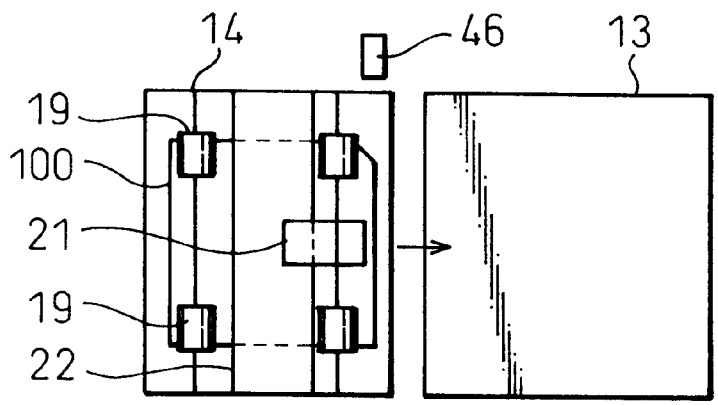
FIGS. 20A to 20G are views illustrating the pushing operation by the pushing arm.
Figure 20B:
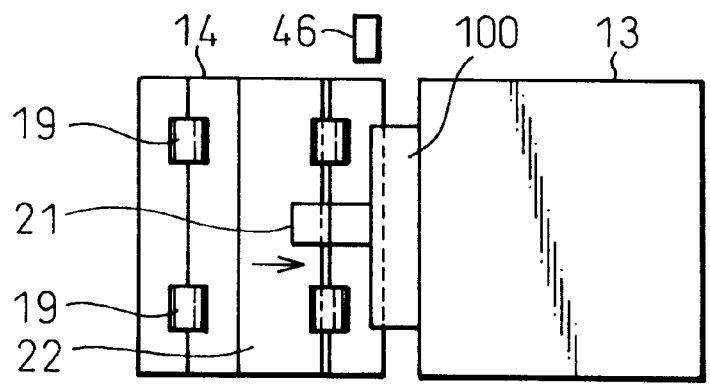
Figure 20C:
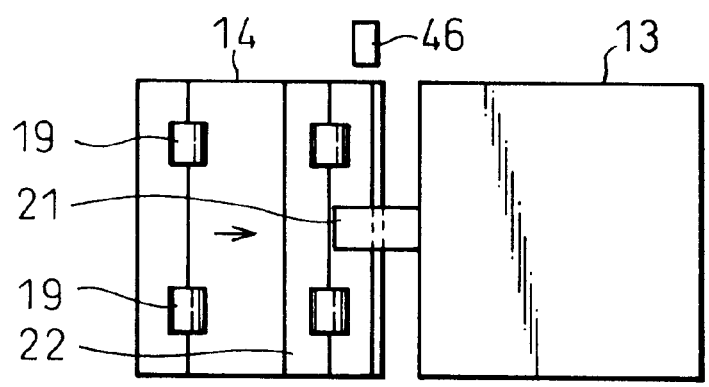

FIGS. 20A to 20G illustrate the pushing operation carried out mainly by the pushing arm 21. When the disk 100 is transferred from the carriage 14 to the drive unit 13, the retry of transferring the disk 100 is carried out by displacing the carriage 14, as shown in FIG. 20A and as described above. The retry of transferring the disk 100 is carried out by the pinch rollers 19 and the retry of pushing the disk 100 is carried out for a pushing time $T_{PUSH}$ after the disk 100 is partially inserted into the slot 13a of the drive unit 13 by the pinch rollers 19, as shown in FIGS. 20B and 20C.

FIG. 21 shows a flow chart for controlling mainly the pushing arm 21 to carry out the retry of pushing the disk 100. In step 41, the retry counter $C_P$ is initialized. In step 42, the disk (device) 100 is fed or transferred by the pinch rollers 19. In step 43, it is determined whether a transfer error occurs or not. If the result is YES (when a transfer error is detected), the retry of transferring the disk 100 by the pinch rollers 19 is carried out, in a manner described above. If the result is NO, the disk 100 is partially inserted into the slot 13a of the drive unit 13 by the pinch rollers 19, and the retry of pushing the disk 100 is started.

In step 44, it is determined whether an operating time of the apparatus 10 is greater than a predetermined time period or not. If the result is YES, the program goes to step 45 in which it is determined whether a pushing time $T_{PUSH}$ is initialized or not. If the result is NO, the pushing time $T_{PUSH}$ is initialized in step 46. If the result in step 44 is NO and if the result in step 45 is YES, the program goes to step 47, and the pushing arm 21 pushes the disk 100 for the pushing time $T_{PUSH}$.

Figure 20D:
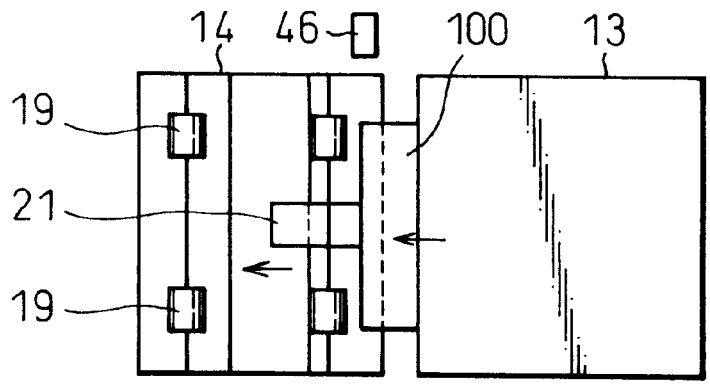

As previously described with reference to FIG. 6, the count of the pushing time $T_{PUSH}$ is started when the leading end of the pushing arm 21 passes through the line 47 extended from the sensor 46, and the pushing arm 21 is returned when the pushing time $T_{PUSH}$ is counted up. If the pushing arm 21 is returned before the pin 43 enters the end 42a of the groove 42, the disk 100 may be returned by the action of the spring 44, as shown in FIG. 20D. To the contrary, if the pushing arm 21 continues to push the disk 100 when the pin 43 enters the end 42a of the groove, the drive unit 13 will be subjected to an excessive load. Therefore, it is desirable that the pushing time $T_{PUSH}$ is as small as possible as far as the pin 43 entering the end 42a of the groove is concerned.

Steps 44 to 46 are provided because the adjusted pushing time $T_{PUSH}$ becomes meaningless when the operating time of the apparatus 10 is greater than a predetermined time period or an environmental condition changes. For example, a load applied to the drive unit 13 becomes greater when the disk 100 is pushed at night when the temperature is low, and a load applied to the drive unit 13 becomes smaller when the disk 100 is pushed in the daytime when the temperature rises. Therefore, the retry pushing time $T_{PUSH}$ stored in the computer during a different situation is meaningless. Therefore, it is preferable to initialize the retry pushing time $T_{PUSH}$ if the operating time of the apparatus 10 is greater than a predetermined time period.

Figure 20E:
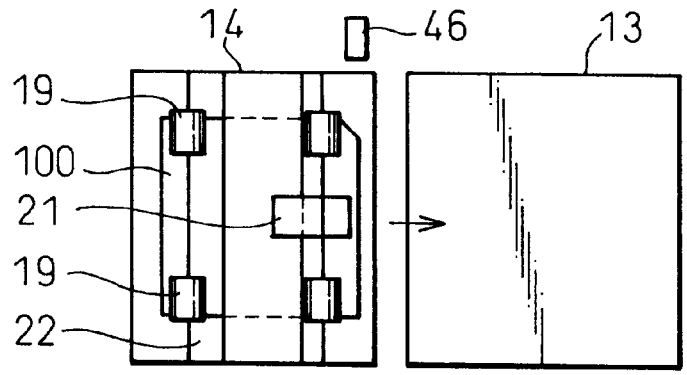

In step 48, it is determined whether the disk 100 is normally inserted or not. The normal insertion of the disk 100 can be detected by the sensor 41 provided on the carriage 14, since the disk 100 may be returned from the drive unit 13 to the carriage 14 if the disk 100 is not normally inserted, as shown in FIG. 20D. When the disk 100 is returned from the drive unit 13 to the carriage 14, the pinch rollers 19 are actuated so that the disk us fully returned in the carriage 14, as shown in FIG. 20E. If the result is YES, the drive unit 13 is ready to use. If the result is NO, the program goes to step 49, and it is determined whether the retry counter $C_P$ reaches the maximum $C_{MAX}$. If the result is YES, the program goes to step 53, and an error procedure is carried out. If the result is NO, the program goes to step 50, and the retry counter $C_P$ is incremented. The retry pushing time $T_{PUSH}$ is then increased by adding a predetermined time $T_{RE}$ in step 51, and the new retry pushing time $T_{PUSH}$ is stored in step 52. The cycle is the repeated.

Figure 20F:
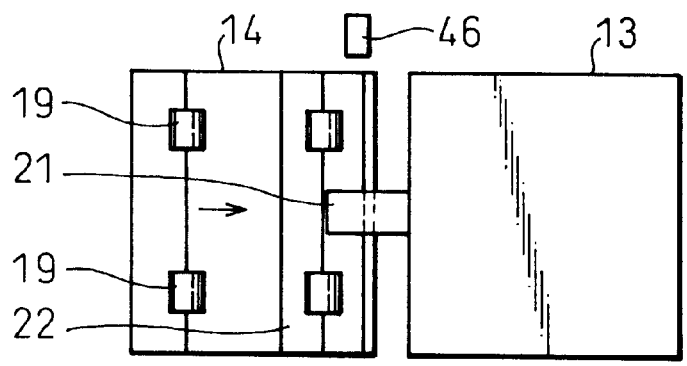
Figure 20G:
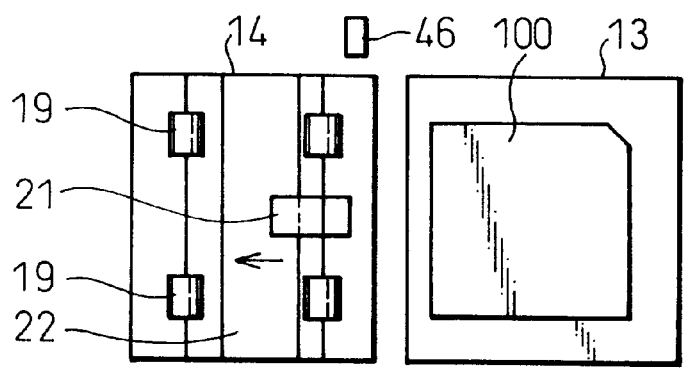

Therefore, the disk 100 is again inserted from the carriage 14 to the drive unit 13, as shown in FIGS. 20E and 20F. The disk 100 may be finally inserted in the drive unit 13, as shown in FIG. 20G. The retry of pushing the disk 100 is repeated in this way by increasing the pushing time $T_{PUSH}$. The pushing time $T_{PUSH}$ when the disk insertion succeeds is stored and can be used at the next disk transfer. Therefore, it is possible to surely set the disk 100 in the drive unit 13 even if there is a variation of load or a change in an environmental condition.

Figure 22:
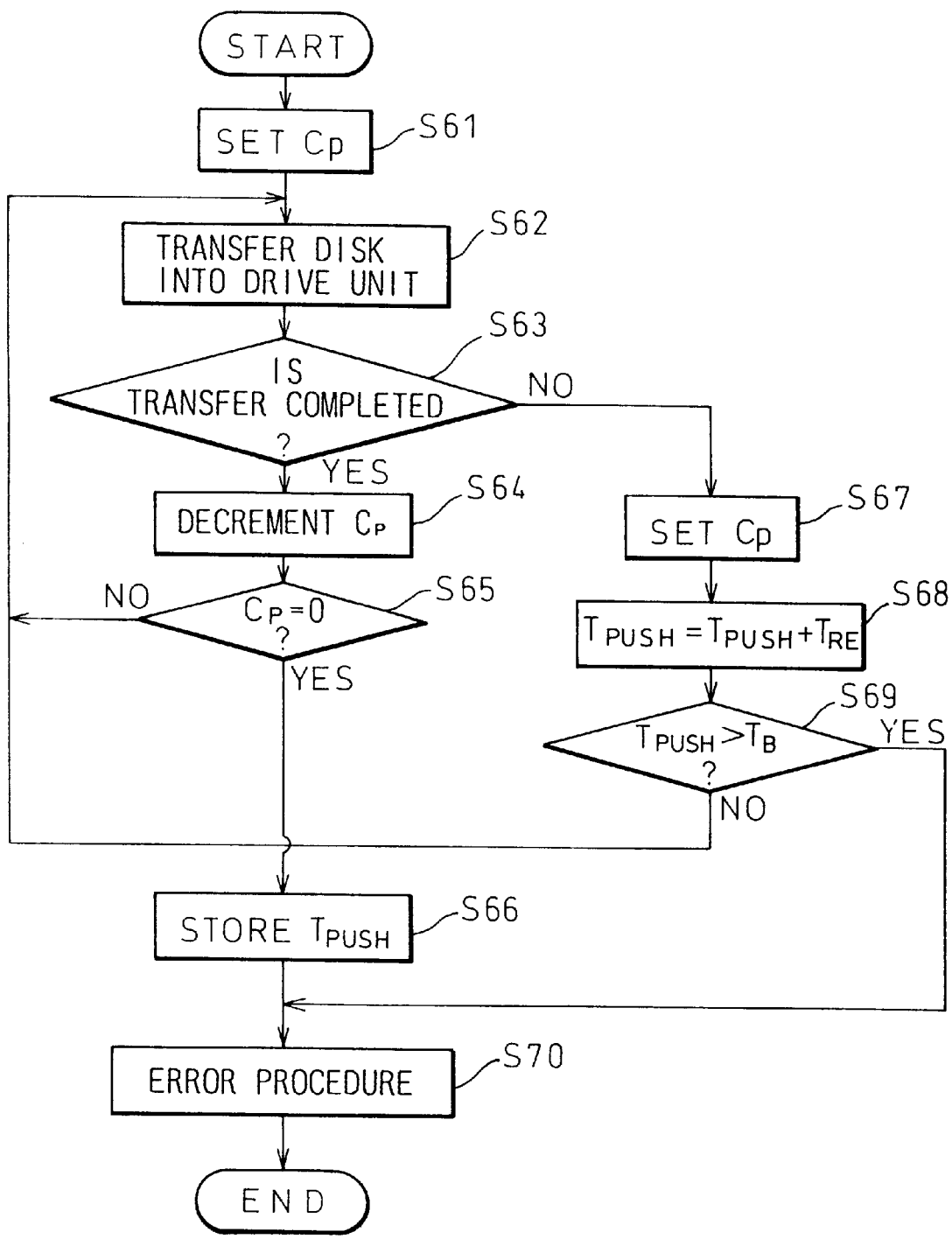
FIG. 22 is a flow chart, similar to but slightly modified from that of FIG. 22.

FIG. 22 shows a modified example of the retry of pushing the disk 100. This is adapted for use upon adjustment of the apparatus 10 before the shipment of the apparatus 10.

In this example, the disk 100 is repeatedly transferred from the carriage 14 to the drive unit 13 by increasing the pushing time $T_{PUSH}$ when the disk 100 is not normally transferred to the drive unit 13 and by maintaining the pushing time $T_{PUSH}$ unchanged when the disk 100 is normally transferred to the drive unit 13, and the pushing time $T_{PUSH}$ when the disk 100 is normally transferred during a plurality of consecutive transfers is stored as a value of the pushing time in the use of the apparatus.

In particular, the retry counter $C_P$ is set to a predetermined value in step 61. The disk (device) 100 is transferred by the punch rollers 19 and by the pushing arm 21 in step 62. It is determined whether a transfer is completed or not in step 63. If the result is YES, the retry counter $C_P$ is decremented in step 64, and it is determined whether the retry counter $C_P$ is zero or not in step 65. The program then returns to step 62. If the result in step 63 is NO, the retry counter $C_P$ is set in step 67, and the pushing time $T_{PUSH}$ is then increased by adding a predetermined time $T_{RE}$. in step 68. In step 69, it is determined whether the pushing time $T_{PUSH}$ is greater than a predetermined value $T_B$ or not. If the result is YES, the program goes to step 70, and an error procedure is carried out. If the result is NO, the program returns to step 62. When the results of step 63 may be YES, and the cycles passing through steps 62 to 65 are repeated, and the pushing time $T_{PUSH}$ finally obtained at step 68 is maintained unchanged during these cycles. The result of step 65 may then become YES, and the program goes to step 66. The pushing time $T_{PUSH}$ when the disk 100 is normally transferred during a plurality of consecutive transfers is stored as a value of the pushing time in the use of the apparatus 10. Accordingly, it is possible to carry out the trials of the retry of pushing the disk 100 in the previous example, using this value.

Figures 23, 24:
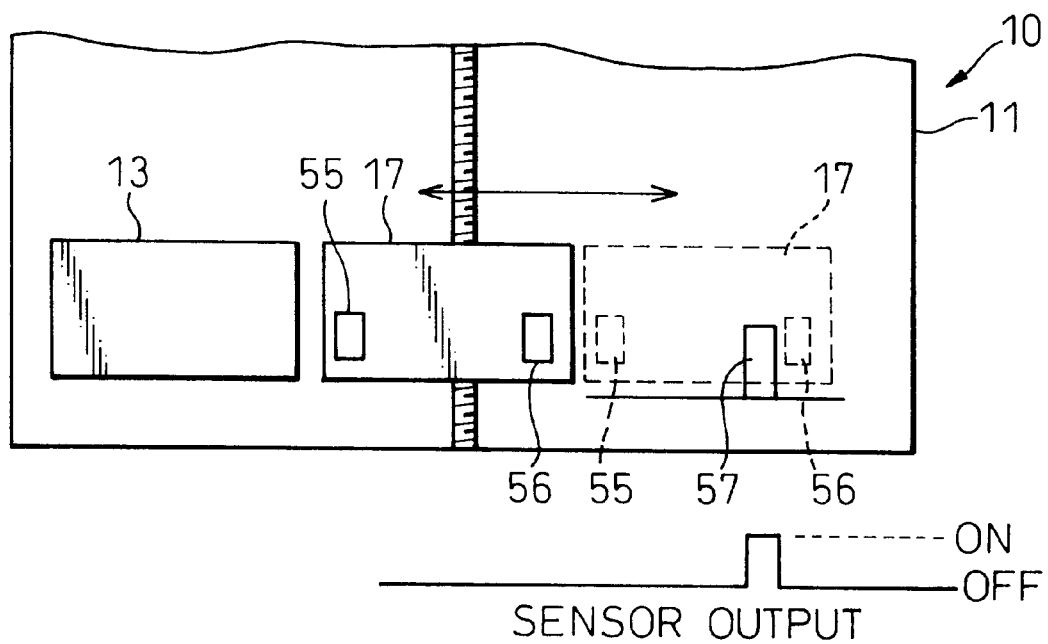
FIG. 23 is a diagrammatic view illustrating the table for calculating the pushing time.
FIG. 24 is a view illustrating a part of the jukebox apparatus and a sensor output for monitoring whether the temporary storage unit is held at the escape position.

FIG. 23 is a diagrammatic view illustrating the table for calculating the pushing time $T_{PUSH}$. In this example, the pushing time $T_{PUSH}$ is determined depending on an initial pushing time t measured from when the pushing arm 21 starts to move, in response to the output from the sensor 41, to when the pushing arm 21 reaches a predetermined point corresponding to the line 47 extended from the sensor 46. The relationship between the pushing time $T_{PUSH}$ and the initial pushing time t is stored as a table in the computer, as shown in FIG. 23. It is considered that as the initial pushing time t is greater, a load for pushing the pushing arm 21 into the driving unit 13 is greater, and vice versa. Therefore, it is possible to securely set the disk 100 into the drive unit 13 by selecting the pushing time $T_{PUSH}$ depending on the initial pushing time t. According to this example, it is not necessary to carry out the retry of pushing the disk 100 of the previous embodiment. However, it is also possible to use the retry of pushing the disk 10 in combination with this example. It is thus possible to reduce the time needed for transferring the disk 100 into the drive unit.

Figure 25:
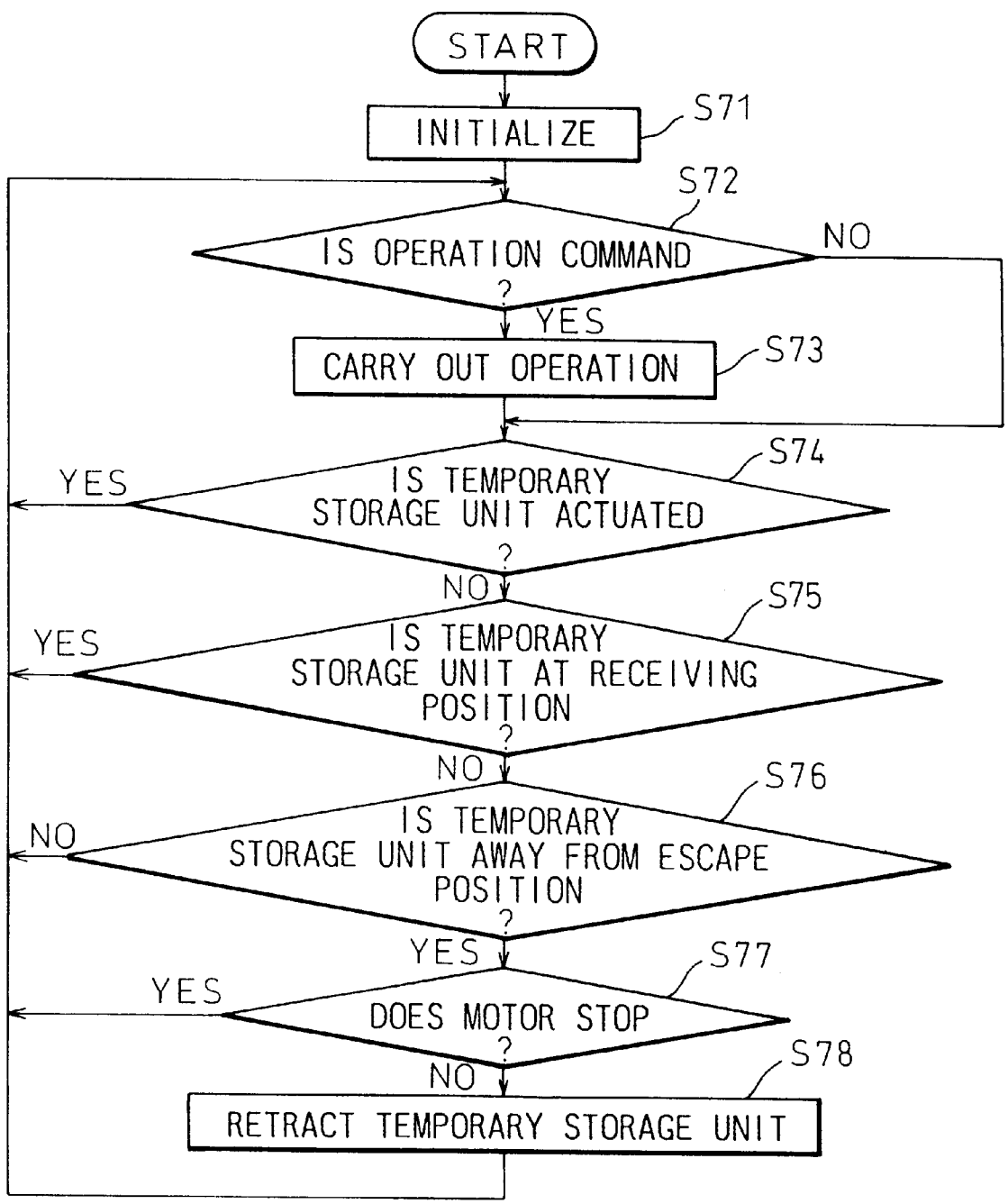
FIG. 25 is a flow chart for controlling the temporary storage unit of FIG. 24.

FIG. 24 shows a further example of the jukebox apparatus 10 including the temporary storage unit 17 arranged in an opposite relationship with the drive unit, and FIG. 25 is a flow chart for controlling the temporary storage unit 17 of FIG. 24. The temporary storage unit 17 has pinch rollers 49 for transferring the disk 100 and can be moved between the transfer position and the escape position along the rack 52, as described above with reference to FIGS. 1 and 9D. The temporary storage unit 17 at the transfer position is shown by the solid line, and the temporary storage unit 17 at the escape position is shown by the broken line in FIG. 24. The temporary storage unit 17 also includes the sensor 55 for detecting the transfer of the disk 100, and the sensor 56 for detecting whether the temporary storage unit 17 is maintained at the escape position or not.

The sensor 56 delivers an ON signal when the sensor 56 passes through the wall 57 provided in the escape position, as shown in FIG. 24. It is possible to detect that the temporary storage unit 17 is moved into the escape position when the ON signal is detected while the temporary storage unit 17 is being retracted to the escape position. According to the present invention, the output of the sensor 56 is also used to normally detect that the temporary storage unit 17 is moved away from the escape position due to an unexpected vibration or the like while the temporary storage unit 17 should be maintained in the escape position, to prevent the carriage 14 from colliding against the temporary storage unit 17.

After initialization in step 71 in FIG. 25, it is determined whether an operation command is delivered or not in step 72 and the operation is carried out. This operation is a general one such as moving the carriage 14 or retracting the temporary storage unit 17 to the escape position, for example, which is started by an appropriate interruption signal. Then, it is determined whether the temporary storage unit 17 is actuated by the motor 54 or not in step 74. If the result is YES, the program returns to step 72. If the result is NO, the program goes to step 75, and it is determined whether the temporary storage unit 17 is at the transfer position (receiving position relative to the drive unit 13) or not. If the result is YES, the program returns to step 72. If the result is NO, the program goes to step 76, and it is determined whether the temporary storage unit 17 is moved away from the escape position or not while the temporary storage unit 17 should be maintained in the escape position. If the result is NO, the program returns to step 72. If the result is YES, the program goes to step 77, and it is determined whether the carriage moving motor 16 is stopped or not. If the result is YES, the program returns to step 72. If the result is NO, the program goes to step 78, and the temporary storage unit 17 is retracted to the escape position. In this way, when the carriage 14 is moving and the temporary storage unit 17 projects on the conveying passage of the carriage 14, the temporary storage unit 17 is caused to retract to the escape position. Therefore, it is possible to prevent the carriage 14 from colliding against the temporary storage unit 17.

Figure 26:
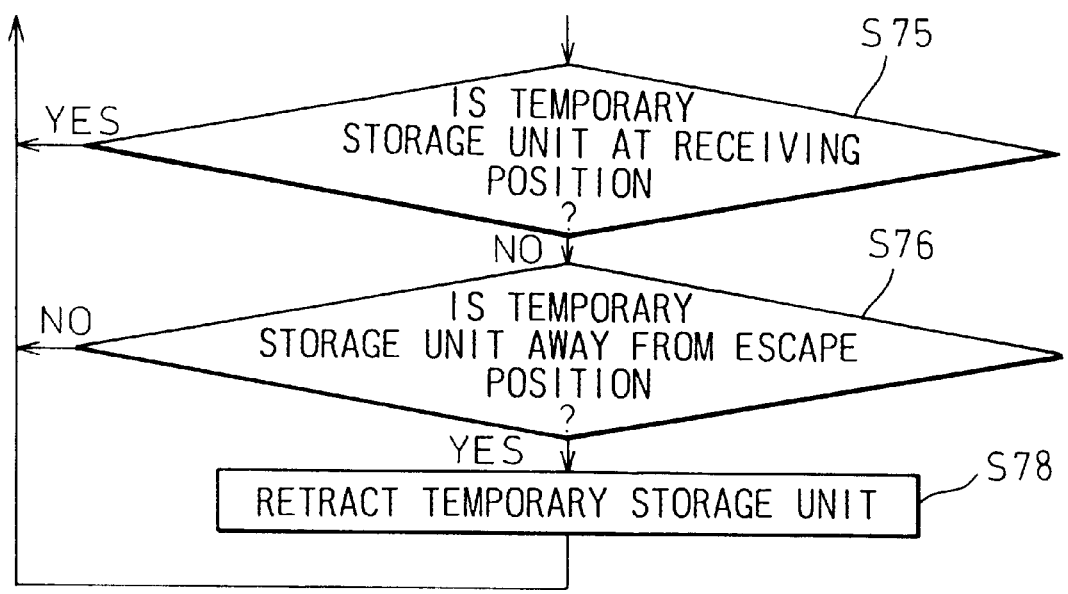
FIG. 26 is a modification of FIG. 26 including steps similar to a part of FIG. 25.

FIG. 26 is a modification of FIG. 25. Only three steps are shown in FIG. 26, but it is possible to include steps 71 to 74 of FIG. 25. However, step 77 in FIG. 25 omitted in FIG. 26. Therefore, the temporary storage unit 17 is retracted to the escape position when the temporary storage unit 17 projects on the conveying passage of the carriage 14, not only while the carriage 14 is moving but also while the carriage 14 is stopped.

The temporary storage unit 17 is retracted to the escape position any time when it is detected that the temporary storage unit 17 projects on the conveying passage of the carriage 14. Therefore, the temporary storage unit 17 may be frequently retracted to the escape position if the apparatus is subjected to a severe vibration. Very frequent retractions may not be advisable, and to avoid such frequent retractions, it is possible to use the following measure, as shown in FIG. 27.

Figure 27:
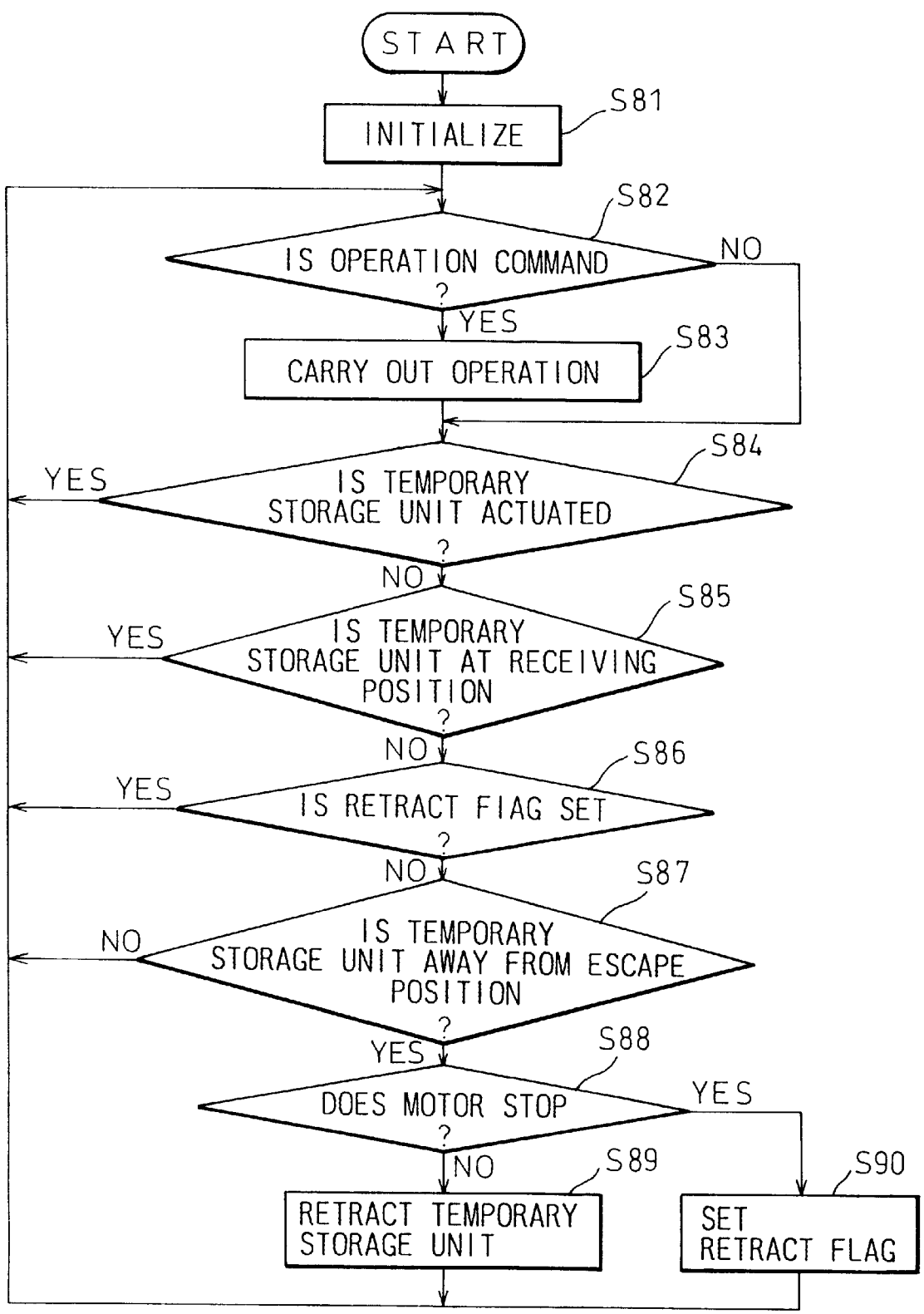
FIG. 27 is a flow chart, similar to but slightly modified from that of FIG. 26.

Steps 81 to 85 in FIG. 27 are similar to steps 71 to 75 in step 25. It is determined whether a retract flag is set or not in step 86. If the result is YES, the program returns to step 82. If the result is NO, the program goes to step 87 like step 76, and it is determined whether the temporary storage unit 17 is moved away from the escape position or not while the temporary storage unit 17 should be maintained at the escape position. If the result is NO, the program returns to step 82. If the result is YES, the program goes to step 88 like step 77, and it is determined whether the carriage moving motor 16 is stopped or not. If the result is NO, the program goes to step 89, and the temporary storage unit 17 is retracted to the escape position. In this way, when the carriage 14 is moving and the temporary storage unit 17 projects on the conveying passage of the carriage 14, the temporary storage unit 17 is retracted to the escape position.

Figure 28:
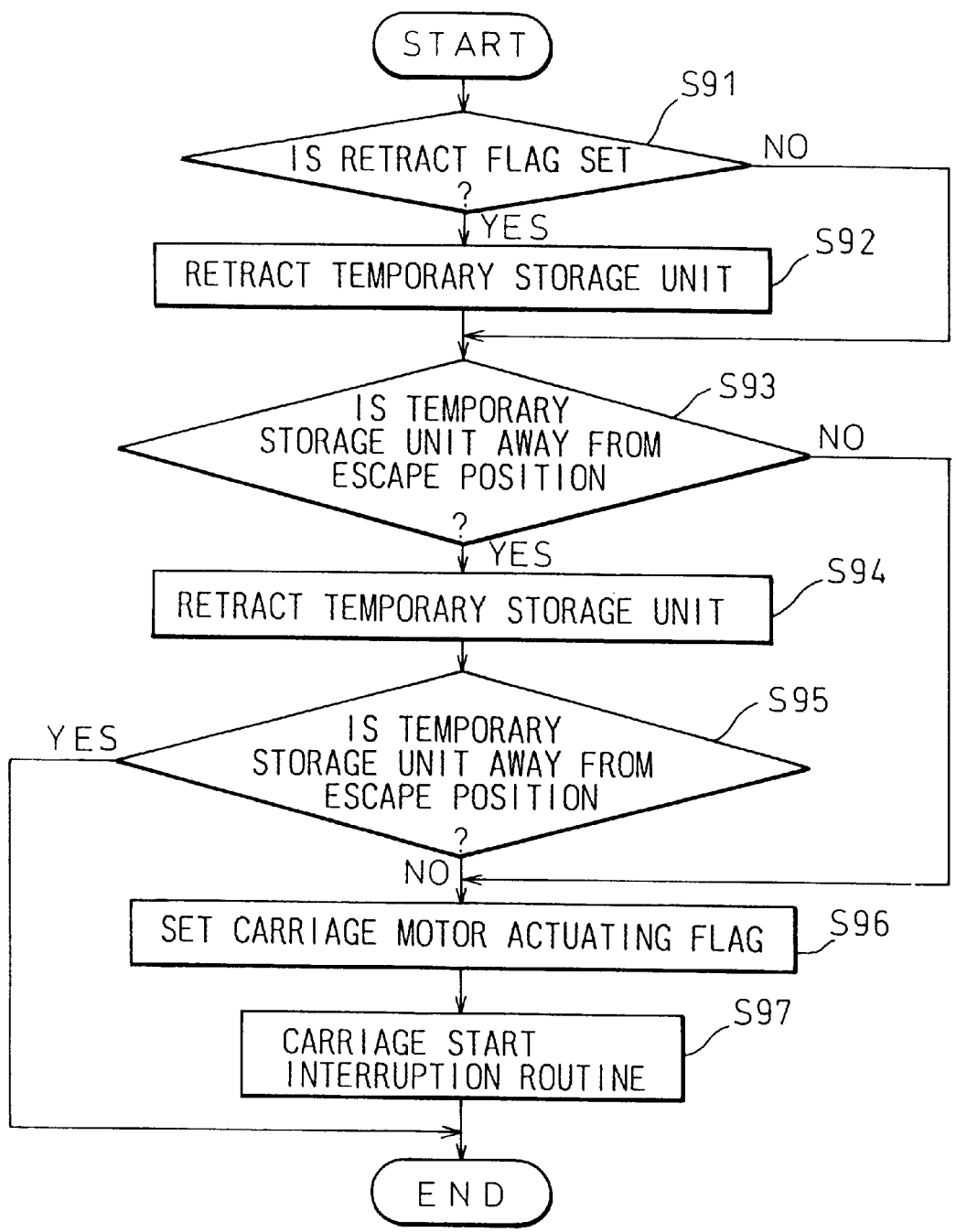
FIG. 28 is a flow chart for controlling the carriage, in relation to the flow chart of FIG. 27.

If the result in step 88 is YES, the program goes to step 90, and a retract flag is set. This retract flag is checked by the control flow chart for moving the carriage 14 which is carried out in steps 82 and 83. FIG. 28 shows the flow chart for moving the carriage 14.

In step 91 in FIG. 28, it is determined whether the retract flag is set or not. If the result is NO, the program goes to step 93. If the result is YES, the program goes to step 92, and the temporary storage unit 17 is retracted to the escape position. Then, the program goes to step 93, and it is determined whether the temporary storage unit 17 is moved away from the escape position or not. If the result is NO, the program goes to step 96. If the result is YES, the program goes to step 94, and the temporary storage unit 17 is retracted to the escape position. The program then goes to step 95, and it is determined again whether the temporary storage unit 17 is moved away from the escape position or not. If the result is YES, the program is ended, assuming that an abnormality has occurred so that the temporary storage unit 17 cannot move to the escape position. If the result in steps 93 and 95 is NO, the program goes to step 96, and a carriage motor actuating flag is set. A carriage moving interruption routine is started in step 97, which is to be carried out in steps 82 and 83.

Figure 29:
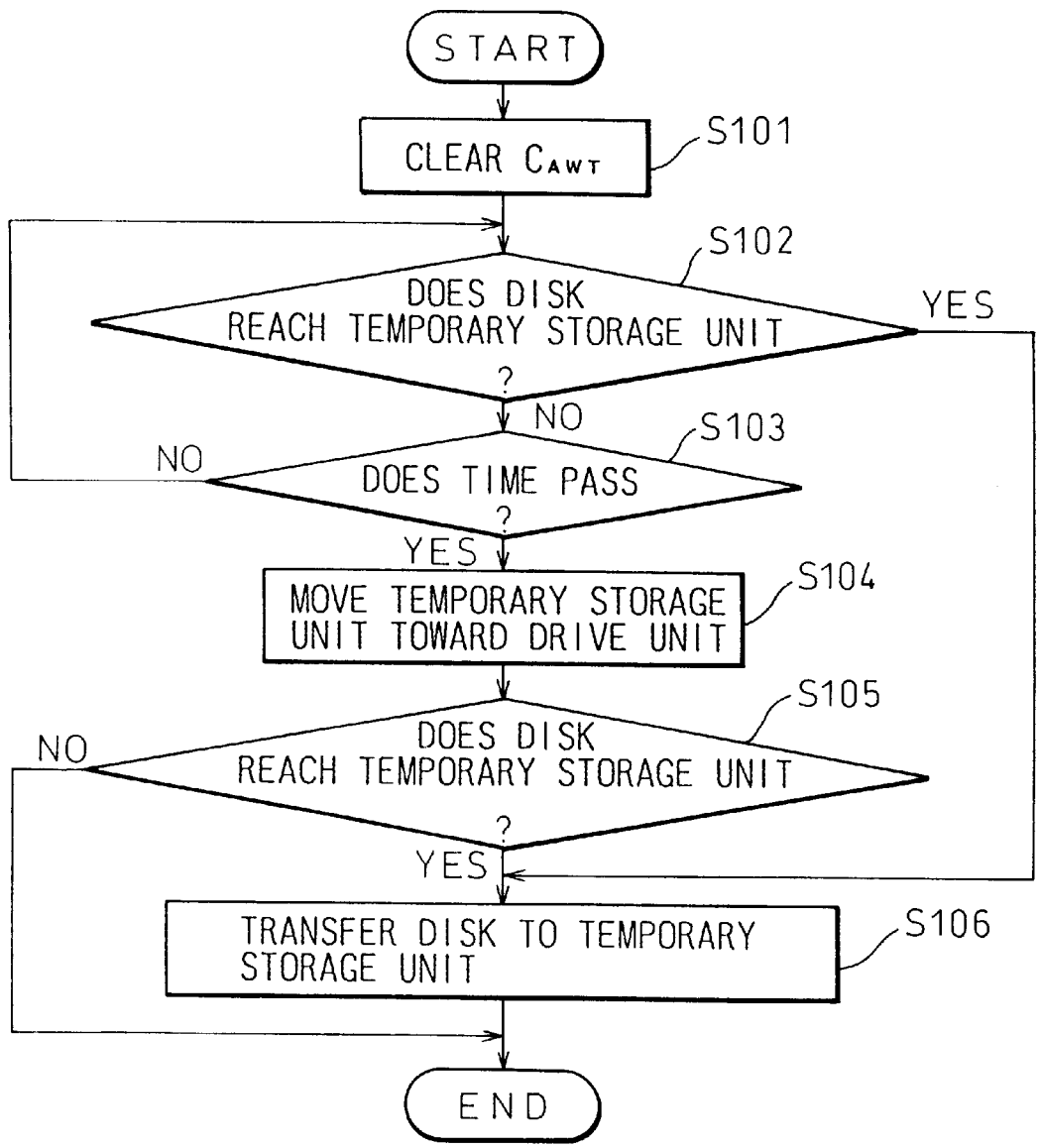
FIG. 29 is a flow chart for controlling the temporary storage unit in front of the drive unit.

FIG. 29 is a flow chart for controlling the temporary storage unit 17 in front of the drive unit 13. This example uses the sensor 55 provided on the temporary storage unit 17 for detecting whether the disk 100 ejected from the drive unit 13 is received by the temporary storage unit 17. This example solves the problem that if the temporary storage unit 17 is subjected to a vibration when the temporary storage unit 17 is at the transfer position in front of the drive unit 13, the temporary storage unit 17 is moved away from the transfer position and the temporary storage unit 17 fails to receive the disk 17 from the drive unit 13 in the transfer position. Therefore, the feature of this example is such that the temporary storage unit 17 is moved toward the drive unit 13 to retry a transfer of the disk 100 when the temporary storage unit 17 fails to receive the disk 17 from the drive unit 13 in the transfer position.

In step 101 in FIG. 29, a time waiting counter $C_{AWT}$ is cleared. It is determined whether the disk (device) 100 reaches the temporary storage unit 17 or not in step 102. The disk 100 is ejected by the eject mechanism in the drive unit 13 toward the pinch rollers 49 of the temporary storage unit 17. If the result is YES, the program goes to step 106. If the result is NO, the program goes to step 103, and it is determined whether the time of the time waiting counter $C_{AWT}$ is has passed or not. If the result is NO, the program goes to step 103. If the result is YES, the program goes to step 104, and the temporary storage unit 17 is moved toward the drive unit 13. It is again determined whether the disk 100 reaches the temporary storage unit 17 or not in step 105. If the result in steps 102 and 105 is YES, the program goes to step 106, and the disk (device) 100 is transferred from the drive unit 13 to the temporary storage unit 17 by the pinch rollers 49 of the latter. If the result in step 105 is NO, the program is ended and an error procedure is carried out. In this way, it is possible to solve a problem that the temporary storage unit 17 is moved away from the transfer position due to a vibration and the temporary storage unit 17 fails to receive the disk 17 from the drive unit 13 in the transfer position, by advancing the temporary storage unit 17 from the transfer position toward the drive unit 13.

Figure 30:
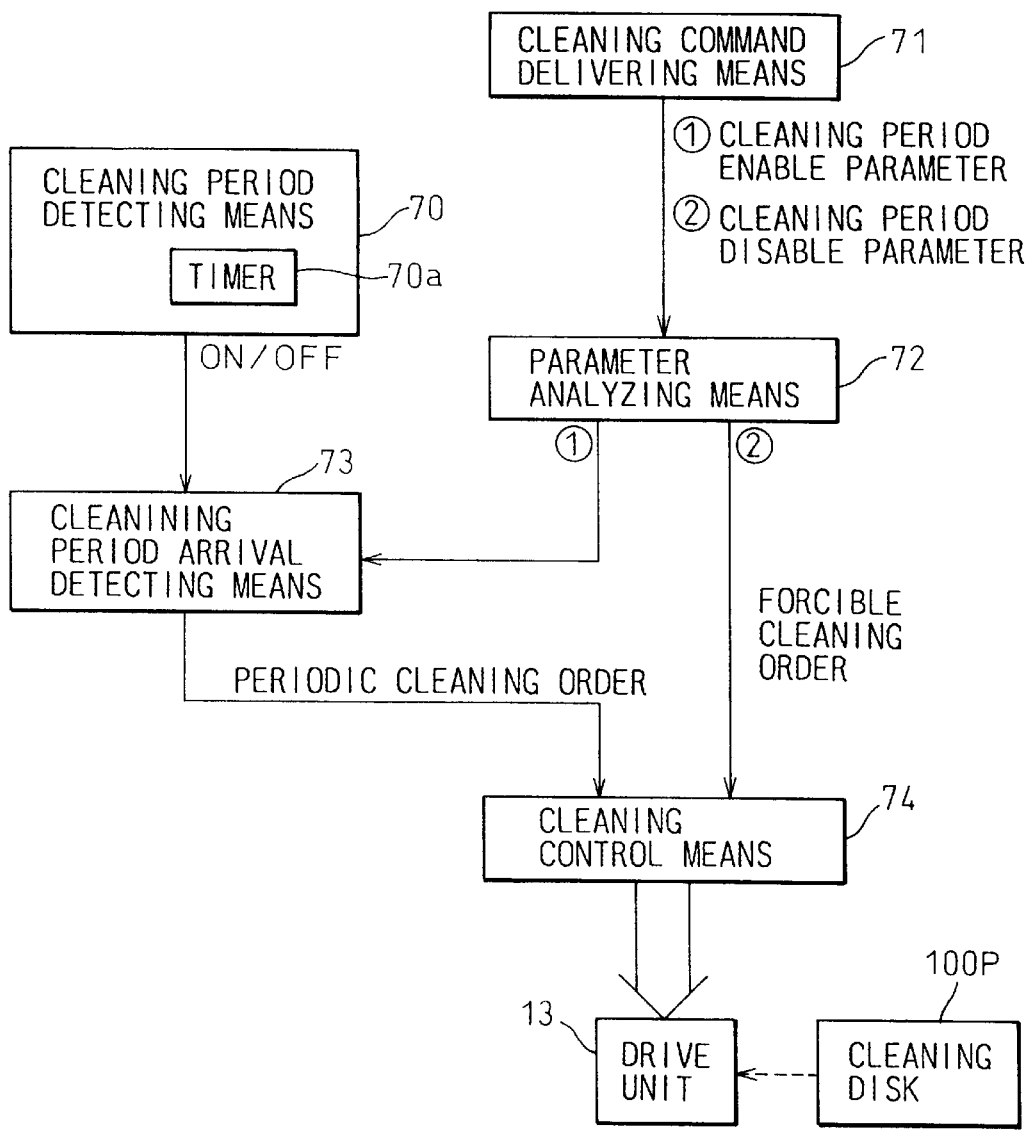
FIG. 30 is a block diagram illustrating the cleaning of the drive unit of the jukebox apparatus.
Figure 31:
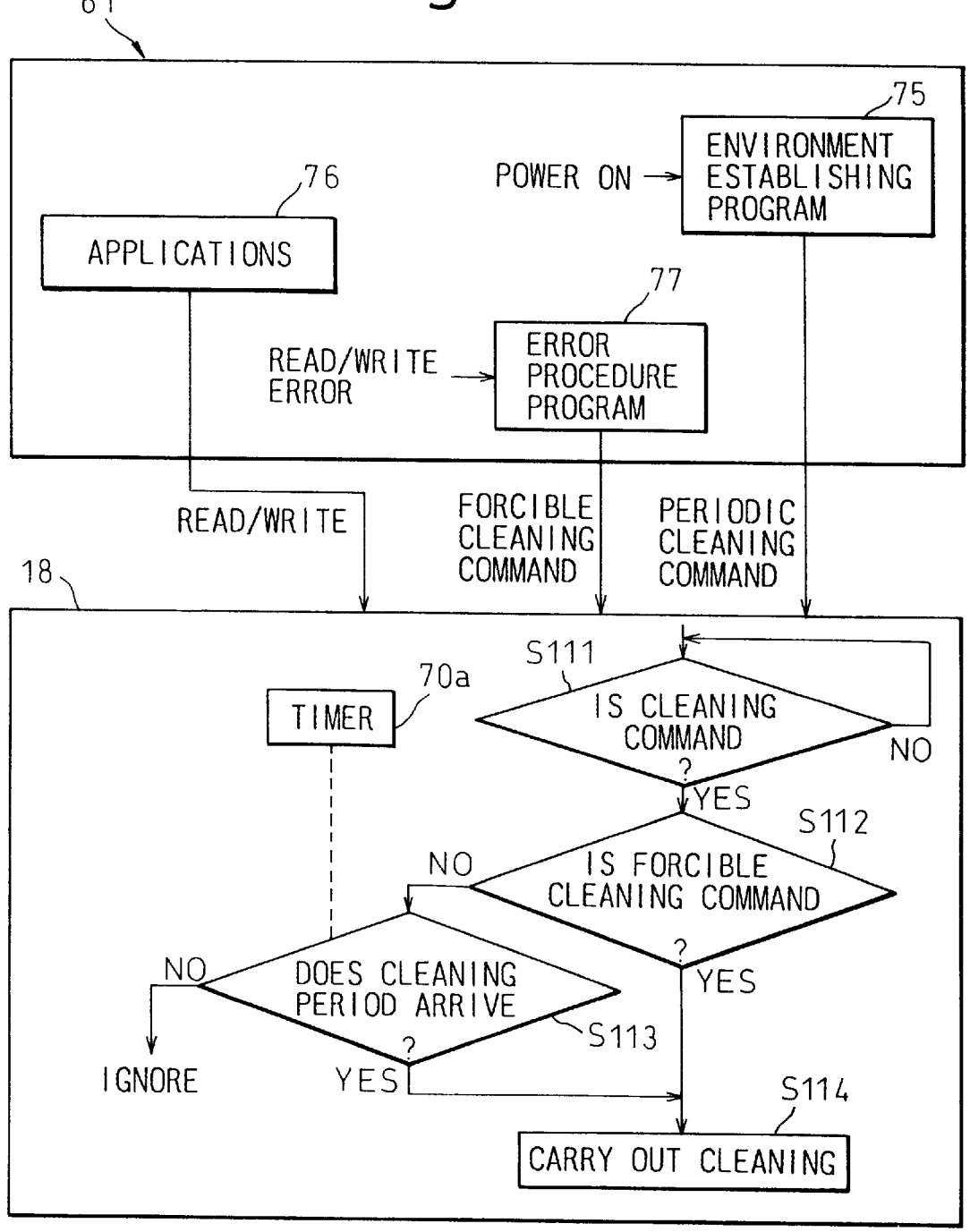
FIG. 31 is a block diagram of the host computer and a flow chart for carrying out the cleaning of the drive unit according to FIG. 30.
Figure 32:
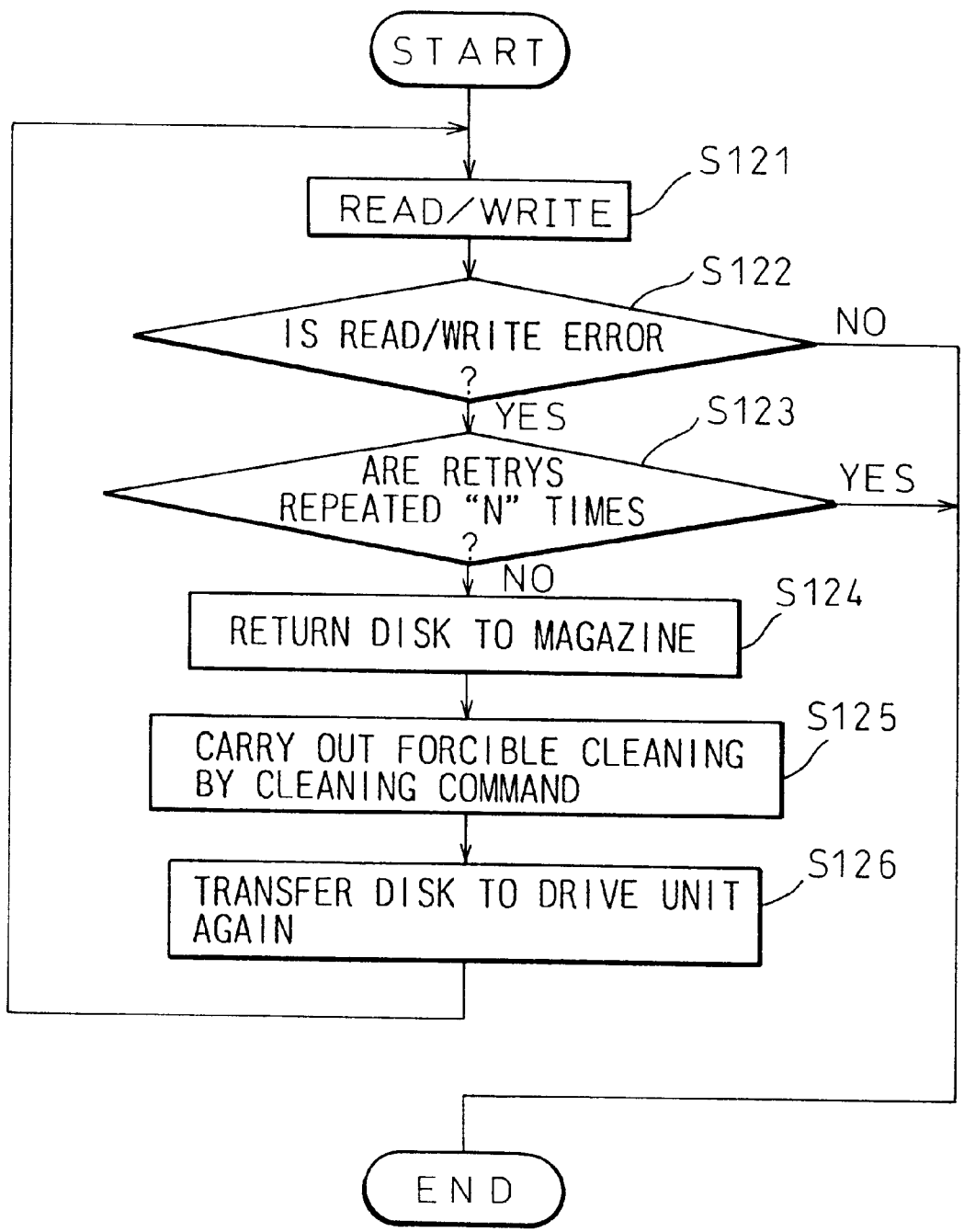
FIG. 32 is a flow chart for carrying out the forcible cleaning of the drive unit.

FIGS. 30 to 32 show the cleaning of the drive unit 13. There is a cleaning disk 100p in the magazine 12, as shown in FIG. 1. When the cleaning of the drive unit is necessary, the cleaning disk 100p is conveyed from the magazine 12 to the drive unit 13. As shown in FIG. 30, a cleaning period detecting or counting means 70 having a timer 70a and a cleaning command delivering means 71 with a cleaning period enabling parameter and a cleaning period disable parameter are provided. A parameter analyzing means 72 receives an output from the cleaning command delivering means 71. A cleaning period arrival detecting means 73 receives an output from the cleaning period detecting means 70 and an output from the parameter analyzing means 72, and delivers a periodic cleaning order to a cleaning control means 74 when an operating time of the apparatus 10 has passed a predetermined time and the cleaning period enabling parameter is received. The parameter analyzing means 72 delivers an optional or forcible cleaning order to the cleaning control means 74 when the cleaning period disable parameter is received. The control unit 74 then delivers a signal to the carriage 14 and the drive unit 13 to carry out the periodic cleaning or the optional cleaning.

As shown in FIG. 31, the host computer 61 includes an environmental establishing program 75, many application programs 76 and an error procedure program 77. The periodic cleaning command (cleaning command with the cleaning period enable parameter) is delivered from the host computer 61 to the control unit 18 of the apparatus 10 when the host computer 61 is switched on. The optional or forcible cleaning command (cleaning command with the cleaning period disable parameter) is also delivered from the host computer 61 to the control unit 18 as desired, for example, in response to a read/write error signal. In the control unit 18, the cleaning is carried out according to steps 111 to 114. In step 111, it is determined whether a cleaning command exists or not. If the result is YES, it is determined whether it is a forcible cleaning command or not. If the result is YES, the program goes to step 114, and the cleaning is forcibly carried out. If the result in step 112 is NO, the program goes to step 113, and it is determined whether the cleaning period has arrived or not. If the result is YES, the program goes to step 114, and the cleaning is carried out. If the result in step 113 is NO, the periodic cleaning command if ignored until the cleaning period arrives.

FIG. 31 shows an example of the forcible cleaning, carried out in response to a read/write error signal. In step 121, a read/write procedure is carried out in the drive unit 13 according to the selected application program. A selected disk 100 is conveyed from the magazine 12 to the drive unit 13 by the carriage 14. The data in the disk 100 is then read or written. In step 122, it is determined whether a read/write error has occurred or not. If the result is YES, the program continues to carry out the read/wright procedure. If the result is YES, it is determined whether the retry of cleaning is repeated N times or not. If the result is YES, the program is ended, judging that an abnormality exists. If the result is NO, the program goes to step 124, and the disk 100 is returned from the drive unit 13 to the magazine 12. In step 125, the forcible cleaning is then carried out based on the forcible cleaning command, by conveying the cleaning disk 100p from the magazine 12 to the drive unit 13. The cleaning disk 100p is then returned from the drive unit 13 to the magazine 12, and the disk 100 which had been used is again conveyed from the magazine 12 to the drive unit 13 and used. This retry of the cleaning is repeated until the result in step 122 becomes YES or until the result in step 123 becomes YES. In this manner, it is possible to appropriately carry out the cleaning of the drive unit 13 in accordance with a desired condition without labor of an operator and to improve the reliability of the system and the efficiency of the operation.

What is claimed is:

1. A jukebox apparatus comprising:
   a magazine having a plurality of slots for accommodating data storing devices therein;
   a drive unit having a slot for receiving a selected data storing device;
   conveying means including a carriage for conveying a data storing device between the magazine and the drive unit along a predetermined conveying path, the carriage having device transferring means for transferring the data storing device between the carriage and the magazine and between the carriage and the drive unit;
   detecting means for detecting whether the data storing device is transferred or not; and
   control means responsive to said detecting means for controlling said carriage and said device transferring means such that the data storing device is transferred when said carriage is conveyed to a reference position in front of one of the magazine and the drive unit, and when said detecting means detects that the data storing device is not transferred in a prior attempt, the carriage is displaced from said reference position to a new position along said predetermined conveying path and the data storing device is transferred again.

2. A jukebox apparatus according to claim 1, wherein the data storing device is repeatedly transferred by displacing the carriage at an interval from the reference position to a position where said detecting means detects that the data storing device is transferred.

3. A jukebox apparatus according to claim 2, wherein said reference position is renewed depending on the position where the data storing device is transferred.

4. A jukebox apparatus according to claim 2, wherein said carriage is further displaced at a displaced position alternatingly in one direction and in the reverse direction.

5. A jukebox apparatus according to claim 1, wherein, upon adjustment of the apparatus, said control means is arranged such that the data storing device is repeatedly transferred by displacing said carriage from a predetermined position in front of one of the magazine and the drive unit in one direction to a first error position where a transfer error is detected and in the reverse direction to a second error position where a transfer error is detected, and an adjusted position is calculated depending on at least one of the first and second error positions.

6. A jukebox apparatus according to claim 5, wherein the data storing device is repeatedly transferred by displacing said carriage at a predetermined interval in one direction from the predetermined position to a third error position where a transfer error is detected and by returning said carriage to a former position where the carriage has passed just prior to the third error position, the data storing device is then repeatedly transferred by displacing said carriage at an interval corresponding to a fraction of the predetermined interval from the former position toward the third error position to a fourth error position where a transfer error is detected, and the adjusted position is calculated depending on the fourth error position.

7. A jukebox apparatus according to claim 5, wherein said carriage is returned to the predetermined position when the data storing device is finally transferred from the carriage to the magazine.

8. A jukebox apparatus according to claim 5, wherein when the data storing device is transferred from the carriage to the drive unit upon adjustment of the apparatus and the data storing device is returned from the drive unit to the carriage without the data storing device being locked in the drive unit.

9. A jukebox apparatus according to claim 5, wherein an adjustable range of the displacement of the carriage is predetermined, and the adjusted position is calculated depending on at least one end of the adjustable range when a transfer error is not detected within said adjustable range.

10. A jukebox apparatus according to claim 5, wherein an adjustable range of the displacement of the carriage is predetermined, and the data storing device is repeatedly transferred by displacing said carriage a predetermined interval in one direction to the first error position where a transfer error is detected and in the reverse direction a distance slightly smaller than said adjustable range and then a said predetermined interval to an error position where a transfer error is detected.

11. A jukebox apparatus according to claim 5, wherein an adjustable range of the displacement of the carriage is predetermined, the data storing device is repeatedly transferred by displacing said carriage at a predetermined interval in one direction to the first error position where a transfer error is detected, and the adjusted position is calculated depending on the first position and the adjustable range.

12. A jukebox apparatus according to claim 5, wherein when the adjusted position for a certain slot of the magazine is obtained, the adjusted position for another slot of the magazine is obtained depending on the adjusted position and the predetermined position for said certain slot.

13. A jukebox apparatus according to claim 1, said control means further controls the drive unit and the carriage to carry out a periodic cleaning of said drive unit and an optional cleaning.

14. A jukebox apparatus according to claim 13, said optional cleaning is carried out when a read or write error is detected in the drive unit.

15. A jukebox apparatus according to claim 1, wherein said magazine is arranged on one side of the conveying path and said drive unit is arranged on the other side of the conveying path.

16. A jukebox apparatus according to claim 15, further comprising a temporary storage unit arranged on the opposite side of said drive unit from the conveying path and movable between a transfer position in which the data storing device can be transferred between the drive unit and the temporary storage unit and an escape position in which the temporary storage unit is retracted from the conveying path of the carriage.

17. A jukebox apparatus according to claim 16, further comprising third detecting means for normally detecting whether said temporary storage unit is moved away from said escape position while said temporary storage unit should be maintained in said escape position.

18. A jukebox apparatus according to claim 17 wherein said temporary storage unit is moved back to said escape position when said third detecting means detects that said temporary storage unit is moved away from said escape position or thereafter.

19. A jukebox apparatus according to claim 18 wherein, when said third detecting means detects that said temporary storage unit is moved away from said escape position while said carriage is stopping, a return flag is set to move back said temporary storage unit to said escape position upon the start of the movement of the carriage.

20. A jukebox apparatus according to claim 17, further comprising a fourth detecting means arranged on the temporary storage unit for detecting whether the data storage device ejected from the drive unit is received by said temporary storage unit, the temporary storage unit being moved toward the drive unit to retry a transfer of the data storage device when the temporary storage unit fails to receive the data storage device from the drive unit in the transfer position.

21. A jukebox apparatus according to claim 16, wherein said device transferring means comprises a pair of gripping arms supported by the carriage for movement toward and away from the magazine to transfer the data storing device between the carriage and the magazine, pairs of pinch rollers rotatably supported by the carriage to move and hold the data storing device, a pushing arm movably attached to the carriage for movement toward and away from the drive unit to push the data storing device into the drive unit, and actuating means for actuating said gripping arms, said pinch rollers and said pushing arm.

22. A jukebox apparatus according to claim 21, wherein said actuating means includes a first motor for rotating said pinch rollers, and a second motor for moving said gripping arms and said pushing arm via an actuating mechanism including an actuating plate, said actuating mechanism being arranged such that said gripping arms are moved toward the magazine when said actuating plate is moved from an initial position to a first position in one direction, said gripping arms are moved away from the magazine when said actuating plate is moved from the first position to the initial position in the reverse direction, said pushing arm is moved toward the drive unit when said actuating plate is moved from the initial position to a second position in the reverse direction, and said pushing arm is moved away from the drive unit when said actuating plate is moved from the second position to the initial position in said one direction.

23. A jukebox apparatus according to claim 22, wherein said temporary storage unit comprises a movable, body and pairs of pinch rollers rotatably supported by the movable body to transfer and hold the data storing device.

24. A jukebox apparatus according to claim 21, wherein said control means controls said actuating means such that said pushing arm is moved toward the drive unit to push the data storing device for a pushing time after the data storing device is transferred from the carriage to the drive unit.

25. A jukebox apparatus according to claim 24, further comprising second detecting means for detecting whether the data storing device is inserted in the drive unit or not, and wherein a retry of device insertion is carried out by increasing the pushing time.

26. A jukebox apparatus according to claim 25, wherein said pushing time is renewed depending on a value of the pushing time when the data storing device is inserted in the drive unit.

27. A jukebox apparatus according to claim 26, wherein said pushing time is initialized when the operating time of said apparatus exceeds a predetermined value.

28. A jukebox apparatus according to claim 24, wherein, upon adjustment of the apparatus, the data storing device is repeatedly inserted from the carriage to the drive unit by increasing the pushing time when the data storing device is not normally inserted in the drive unit and by maintaining the pushing time unchanged when the data storing device is normally inserted in-the drive unit, and the pushing time when the data storing device is normally inserted during a plurality of consecutive trials is stored as a value of the pushing time in the use of the apparatus.

29. A jukebox apparatus according to claim 24, wherein the initial pushing time is from when the pushing arm starts to move to when the pushing arm reaches a predetermined point, and the pushing time is determined depending on said initial pushing time.

* * * * *